United States Patent
Dorier et al.

(10) Patent No.: US 10,890,485 B2
(45) Date of Patent: *Jan. 12, 2021

(54) SYSTEMS, METHODS, AND COMPUTER PROGRAMS FOR GENERATING A MEASURE OF AUTHENTICITY OF AN OBJECT

(71) Applicant: SICPA HOLDING SA, Prilly (CH)

(72) Inventors: Jean-Luc Dorier, Bussigny (CH); Xavier-Cédric Raemy, Belmont-sur-Lausanne (CH); Todor Dinoev, Chavannes-près-Renens (CH); Edmund Halasz, Orbe (CH)

(73) Assignee: SICPA HOLDING SA, Prilly (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/311,627

(22) PCT Filed: Jun. 26, 2017

(86) PCT No.: PCT/EP2017/065666
§ 371 (c)(1),
(2) Date: Dec. 19, 2018

(87) PCT Pub. No.: WO2018/001941
PCT Pub. Date: Jan. 4, 2018

(65) Prior Publication Data
US 2019/0234799 A1 Aug. 1, 2019

(30) Foreign Application Priority Data
Jun. 30, 2016 (EP) ..................................... 16177270

(51) Int. Cl.
*G01J 3/28* (2006.01)
*G07D 7/202* (2016.01)
(Continued)

(52) U.S. Cl.
CPC ........... *G01J 3/2823* (2013.01); *G01J 3/0229* (2013.01); *G01J 3/0254* (2013.01); *G01J 3/1838* (2013.01); *G07D 7/1205* (2017.05); *G07D 7/205* (2013.01)

(58) Field of Classification Search
CPC ...... G01J 3/2823; G01J 3/0229; G01J 3/0254; G01J 3/1838; G01J 3/02; G01J 3/26; G01J 3/28; G07D 7/205; G07D 7/1205
See application file for complete search history.

(56) References Cited

U.S. PATENT DOCUMENTS

2010/0013979 A1* 1/2010 Golub ................... G01J 3/2803
 348/340
2010/0141952 A1 6/2010 Myrick et al.
(Continued)

FOREIGN PATENT DOCUMENTS

CN 202533362 11/2012
DE 102006045624 4/2008
(Continued)

OTHER PUBLICATIONS

Hagen et al, "Snapshot advantage: a review of the light collection improvement for parallel high-dimensional measurement systems", Optical Engineering 51(11), 111702 (2012), 14 pages.
(Continued)

*Primary Examiner* — Abdullahi Nur
(74) *Attorney, Agent, or Firm* — Muncy, Geissler, Olds & Lowe, P.C.

(57) ABSTRACT

An imaging system (200) for generating a measure of authenticity of an object (10) comprises a dispersive imaging arrangement (30) and an image sensor arrangement (60). They are positioned so that, when electromagnetic radiation (20) from the object (10) illuminates the dispersive imaging arrangement (30), the electromagnetic radiation is dispersed and imaged by the image sensor arrangement (60). The
(Continued)

imaging system (200) is configured to then generate a measure of authenticity of the object (10) depending at least on a relation between the imaged dispersed electromagnetic radiation and reference spectral information. The invention also relates to imaging methods, computer programs, computer program products, and storage mediums.

15 Claims, 28 Drawing Sheets

(51) Int. Cl.
*G07D 7/1205* (2016.01)
*G01J 3/02* (2006.01)
*G01J 3/18* (2006.01)

(56) References Cited

U.S. PATENT DOCUMENTS

| | | | |
|---|---|---|---|
| 2012/0008133 | A1 | 1/2012 | Silny et al. |
| 2015/0156394 | A1 | 6/2015 | Denis |

FOREIGN PATENT DOCUMENTS

| | | |
|---|---|---|
| WO | 2008113962 | 9/2008 |
| WO | 2014187474 | 11/2014 |
| WO | 2016042025 | 3/2016 |

OTHER PUBLICATIONS

Hagen et al, "Review of snapshot spectral imaging technologies", Optical Engineering 52(9), 090901 (Sep. 2013), 24 pages.

Yakov G. Soskind, "Field Guide to Diffractive Optics", SPIE, 2011, 135 pages.

ISO/IEC 15415 Barcode Print Quality Test Specification-2D Symbols, see p. 31ff in section 4.6.1.2 entitled "Parameters Measured and their Significance" of "GS1 DataMatrix Guideline, Overview and technical introduction to the use of GS1 DataMatrix", Release 2.2.1, Ratified, Jul. 2015, retrieved from http://www.gs1.org/docs/barcodes/GS1_DataMatrix_Guideline.pdf, 58 pages.

Schroeder, D.V., 2003. "Radiant Energy," online chapter for the course, 'Energy, Entropy, and Everything,' Physics Department, Weber State University [accessed May 2016] http://physics.weber.edu/schroeder/eee/chapter6.pdf, 3 pages.

International Search Report and Written Opinion issued with respect to application No. PCT/EP2017/065666, 9 pages.

YUVladimir, The web article "*Reconstruction of defocused and blurred images*" which can be found at https://habr.com/ru/post/136853, Jan. 23, 2012, pp. 1-12.

Eurasian Office Action in counterpart Eurasian Application No. 201892786/31 dated Jun. 19, 2020 (along with the English language translation of the Office Action).

Eurasian Office Action in counterpart Eurasian Application No. 201892786 dated Jan. 31, 2020 (and English language translation of the Office Action).

\* cited by examiner

Respective images on the image sensor after dispersion

Ink spectrum used to print the marking A and B

Position of the marking A within the field of view of the system

Position of the marking B within the field of view of the system

Respective images on the image sensor after dispersion

Ink A spectrum (genuine) used to print the marking A

Ink B spectrum (fake) used to print the marking B

Position of the marking A within the field of view of the system

Position of the marking B within the field of view of the system

SYSTEMS, METHODS, AND COMPUTER PROGRAMS FOR GENERATING A MEASURE OF AUTHENTICITY OF AN OBJECT

TECHNICAL FIELD

The present invention relates to systems for generating a measure of authenticity of an object. The invention also relates to methods, computer programs, computer program products, and storage mediums for the same purposes.

BACKGROUND

The supply of counterfeit goods in a particular market causes a loss of revenue to manufacturers of the corresponding genuine goods, as well as to governments when those goods are subject to taxation. End users are adversely affected by counterfeit goods because they are supplied with products of inferior quality, which may even be dangerous to the health of the end user for certain products, such as when medicines are the subject of counterfeiting. The manufacturer of high-quality genuine products will consequently suffer a loss to its goodwill.

A number of anti-counterfeiting measures have been proposed in the prior art with respect, for example, to alcoholic and non-alcoholic drinks (beer, wine, liquor, soft-drinks, etc.), tobacco products (cigarettes, cigars, loose tobacco, etc.), medicinal products, perfumes and excisable products generally. It is known to make use of sophisticated printing techniques to make the design on the package as hard to replicate as possible.

It is also known to make use of fluorescing items that look one way under ambient light and look a different way under ultraviolet (UV) radiation. Also used are holographic images of varying degrees of complexity. Other known techniques include watermark technology, engraved gravure lines and marks that change colour depending on heat applied to the mark.

CN 202533362 U relates to a printed matter authenticity identification device based on a multispectral imaging technology. The device comprises a multispectral imager for carrying out multispectral scanning on a test sample (the multispectral imager comprising a light source, a grating, and an imaging detector), a spectral data processor for comparing spectral data obtained from scanning with spectral data of a standard sample, and a data server used for storing the spectral data of the standard sample. If the difference between the spectral data obtained from scanning and the spectral data of a standard sample exceeds a set threshold value, the test sample is judged as fake. Otherwise, it is judged as authentic.

The prior art also includes various imaging spectrometers used for scientific observations. These systems typically aim at obtaining high-resolution spatial and spectral information about all regions of a scene or object. In particular, imaging spectrometers are imagers that allow extraction of three-dimensional spectral irradiance map of a planar object (spatial-spectral data cube) $I(x, y, \Delta)$ by use of two-dimensional array detectors such as CCD (i.e., charge-coupled device) or CMOS (i.e., complementary metal-oxide-semiconductor) sensors. One dimension is the wavelength and the other two comprise the spatial information.

Two major categories of spectral imagers exist: the spectral scanning imagers and the snapshot spectral imagers. A review of multi- and hyperspectral imager can be found for example in Hagen et al, "Snapshot advantage: a review of the light collection improvement for parallel high-dimensional measurement systems", Optical Engineering 51(11), 111702 (2012), and Hagen et al, "Review of snapshot spectral imaging technologies", Optical Engineering 52(9), 090901 (September 2013).

One way to acquire three-dimensional information by a two-dimensional sensor is to acquire sequentially images through mechanically scanned wheel or array of optical filters installed in front of an imager. Another possibility is to tune the central transmission band of a filter such as a multi-stage liquid crystal filter, an acousto-optic filter, or a Fabry-Perot interferometer. These two examples fall into the category of spectral scanning imagers.

Snapshot spectral imagers capable of simultaneous acquisition of images in different spectral bands through an array of filters exist and an example is the multi-aperture filtered camera (MAFC), using lenslet arrays with focal plane detector.

Transmission diffraction gratings based snapshot spectral imaging systems also exist. An example is the computed tomography imaging spectrometer (CTIS) which either uses several crossed transmission gratings or specifically designed Kinoform grating able to disperse several spectral orders around a zero order.

Computed tomography algorithms have to be used to reconstruct the spectral radiance of the object.

Another example with transmission diffraction grating is the coded aperture snapshot spectral imager (CASSI) which uses complex masks to shadow some parts of the image of the object in order to facilitate the spectra extraction.

Integral field imaging spectrometers rely also on diffraction gratings to disperse the light. In these setups, the image is sliced by different methods to fit onto an input slit of a conventional spectrometer to extract spectra. Image slicing can be obtained either by use of fiber bundle and distributing individual fibers into an entrance slit, or by aperture division using lenslet array.

Fourier transform imaging spectrometers also exist in a separate category. An interferometer is scanned to obtain images at different optical path differences and spectra are reconstructed by Fourier transform. Some setups rely on lenslet array to do aperture division and analyse the average spectra at different parts of the image/object. An example is the multiple-image Fourier transform spectrometer (MIFTS) based on a Michelson interferometer. Another distinct example is the snapshot hyperspectral imaging Fourier transform spectrometer (SHIFT) which uses pair of birefringent prisms to obtain different optical path lengths.

In view of the above, there is a need for providing fast, simple, inexpensive, compact, and robust equipment for authentication purposes, in particular, but not only, for incorporation into hand-held audit devices.

SUMMARY

To meet or at least partially meet the above-mentioned goals, systems, methods, computer programs, computer program products, and storage mediums according to the invention are defined in the independent claims. Particular embodiments are defined in the dependent claims.

In one embodiment, an imaging system is provided for generating a measure of authenticity of an object. The imaging system comprises one or more image sensors, the one or more image sensors being hereinafter referred to as "image sensor arrangement", and one or more optical elements, the one or more optical elements being hereinafter referred to as "dispersive imaging arrangement". The dispersive imaging arrangement is so that, when electromagnetic radiation from the object illuminates the dispersive imaging arrangement, at least part of the electromagnetic radiation is dispersed. Furthermore, the dispersive imaging arrangement is positioned relative to the image sensor arrangement in such a manner as to allow the image sensor arrangement to image said dispersed electromagnetic radiation. The imaging system is configured for, after the image sensor arrangement has imaged the dispersed electromagnetic radiation in at least one imaging period, generating a measure of authenticity of the object depending at least on a relation between the imaged dispersed electromagnetic radiation and reference spectral information.

Such an imaging system enables the efficient verification of whether, and/or the extent to which, the relation between the imaged dispersed electromagnetic radiation and reference spectral information, which represents the expected spectral composition of the electromagnetic radiation from the object, matches the predicted physics, in a situation in which some information about the electromagnetic radiation prior to dispersion, i.e. some spatial information about the source of the radiation, is known or assumed (such as for example spatial information about the type of mark, sign or code that the imaged object bears). If the relation matches the predicted physics, the object is likely to be authentic. Otherwise, the object is more likely to be a counterfeit.

The invention also relates, in one embodiment, to an imaging method for generating a measure of authenticity of an object. The imaging method makes use of: one or more image sensors, the one or more image sensors being referred to, as mentioned above, as "image sensor arrangement", and one or more optical elements, the one or more optical elements being referred to, as mentioned above, as "dispersive imaging arrangement". The dispersive imaging arrangement is so that, when electromagnetic radiation from the object illuminates the dispersive imaging arrangement, at least part of the electromagnetic radiation is dispersed. Furthermore, the dispersive imaging arrangement is positioned relative to the image sensor arrangement in such a manner as to allow the image sensor arrangement to image said dispersed electromagnetic radiation. The imaging method comprises: imaging, by the image sensor arrangement, the dispersed electromagnetic radiation in at least one imaging period, and generating a measure of authenticity of the object depending at least on a relation between the imaged dispersed electromagnetic radiation and reference spectral information.

The invention also relates, in some embodiments, to a computer program or a set of computer programs for carrying out an imaging method as described above, to a computer program product or a set of computer program products for storing a computer program or a set of computer programs as described above, and to a storage medium for storing a computer program or a set of computer programs as described above.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to restrict the scope of the invention, which is defined by the appended claims. A list of abbreviations and their meaning is provided at the end of the detailed description.

Figure 1:
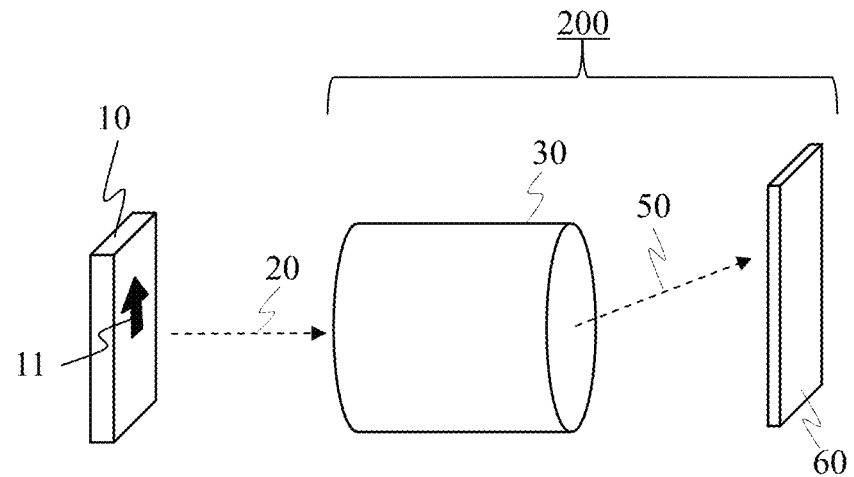
FIG. 1 schematically illustrates an object to be imaged and an imaging system in one embodiment of the invention.

FIG. 1 schematically illustrates an imaging system 200 in one embodiment of the invention. System 200 aims at generating a measure of authenticity of an object 10, i.e. an article. Object 10 may for example be, without being limited to, a bottle or can of beer, wine, liquor or soft-drink, a pack, packet or box of cigarettes or cigars, a medicine pack, a bottle of perfume, or any other excisable goods, a banknote, a value paper, an identity document, a card, ticket, label, banderol, security foil, security thread or the like. Object 10 has at least one part, surface or side bearing a visible or invisible mark, logo, sign, image, or pattern, for example printed with a printing ink and/or coating, either printed on a label apposed on object 10 or printed directly on object 10 (such as on a cap, capsule or the like of object 10, wherein the cap or capsule may for example have a coloured background). The expected spectral response of said part, surface or side, and possibly the ink thereon (which may or may not have, for example, photoluminescent properties), when subject to particular illumination conditions, is known and constitutes the reference spectral information. Some spatial information about the visible or invisible mark, logo, sign, image, or pattern that object 10 bears is also known or assumed to be known, as will be explained below.

System 200 comprises an arrangement 60, hereinafter referred to as "image sensor arrangement" 60, consisting in one or more image sensors. System 200 also comprises another arrangement 30, hereinafter referred to as "dispersive imaging arrangement" 30, consisting in one or more optical elements.

In one embodiment, image sensor arrangement 60 comprises one or more array CCD or CMOS detectors to record the intensity distribution of the incident electromagnetic energy. Dispersive imaging arrangement 30 not only disperses electromagnetic energy but may also gather electromagnetic energy from object 10 and focus the electromagnetic energy rays to produce a dispersed image of object 10 onto an image plane where image sensor arrangement 60 is positioned. In one embodiment, dispersive imaging arrangement 30 comprises, on the one hand, at least one of a diffractive element, a refractive element, one or more lenses, and an objective, in order to produce a dispersed image of object 10 onto the image plane where image sensor arrangement 60 is positioned, and, on the other hand, a long pass filter (also called "long-wavelength pass filter") in order to limit the spectral range used for authentication.

System 200 may also comprise optionally various auxiliary elements (not shown in FIG. 1) such as for example any one or any combination of: a) a housing for containing, covering and/or protecting dispersive imaging arrangement 30 and image sensor arrangement 60; b) supporting elements integrally formed within the housing, or attached thereto, to maintain dispersive imaging arrangement 30 in a fixed or substantially fixed relative position with respect to image sensor arrangement 60; c) a protective cover or protective covering means to be used between object 10 and dispersive imaging arrangement 30 to avoid parasitic illumination from ambient light and/or sunlight (in this case, a controlled illumination source may be contained within this protective cover); d) additional optical filters (long-pass, bandpass, etc.), which may for example be advantageous if imaging system 200 operates in luminescence mode, to cut out the irradiation source reflection; e) a controller or controlling means or units for controlling the operation of image sensor arrangement 60 and other elements; f) outputting and inputting means for providing information to and receiving information from an operator, such as a display screen, a keyboard, push-buttons, control knobs, LED indicator lights, etc. (in that respect, see also FIG. 38 and the corresponding description); and g) a battery for powering various electronic parts of system 200.

Dispersive imaging arrangement 30 is constituted and positioned so that, when electromagnetic radiation 20 from object 10 illuminates dispersive imaging arrangement 30 or in particular a specific part, surface, side, aperture or opening thereof, at least part of radiation 20 is dispersed. The word "dispersive" means here: that separates in its constituent wavelength components. Arrangement 30 may for example comprise: a diffractive element, a transmission diffraction grating (also known simply as "transmission grating", or rarely as "transmissive diffraction grating"), a blazed transmission diffraction grating, a volume holographic grating, a grism (also called "grating prism"), a reflective diffraction grating, a dispersive prism, or a combination of any of those. If arrangement 30 diffracts radiation 20, dispersed electromagnetic radiation 50 may be referred to as a non-zero diffraction order part, such as for example the negative or positive first diffraction order part of the radiation.

Here are some examples of transmission gratings that may be used in some embodiments of the invention:

Example 1: Especially for a transmission grating mounted in front of an objective (see also in that respect FIGS. 4 and 23), a Thorlabs #GT13-06V (from Thorlabs, Inc., based in Newton, N.J., U.S.) with grooves density 600 lines per mm (l/mm), blaze angle 28.7°, size 12.7×12.7×3 mm from Schott B270 glass, may be used.

Example 2: Especially for a transmission grating mounted between an objective and the image sensor(s) (see also in that respect FIGS. 5, 6, and 24), a Richardson grating 340056TB07-775R (from Newport Corporation, based in Rochester, N.Y., U.S.) with grooves density of 360 l/mm, blaze angle 21°, and size 12.7×12.7×3 mm, may be used.

Example 3: Especially for a back-mounted grating for extended field of view, a Thorlabs #GTU13-06 with grooves density 600 l/mm, blaze angle 22°, and size 12.7×12.7×2 mm from fused silica, may be used.

Electromagnetic radiation 20 coming from object 10 and illuminating dispersive imaging arrangement 30 may originate in part or in full from the reflection of electromagnetic radiation emitted by an electromagnetic radiation source (not shown in FIG. 1). Radiation 20 from object 10 and illuminating arrangement 30 may alternatively, or additionally, originate in part or in full from some form of photoluminescence (i.e., fluorescence or phosphorescence) of a substance of object 10 upon or after the illumination of object 10 by electromagnetic radiation emitted by an electromagnetic radiation source. In both cases (i.e., radiation by reflection or by some form of photoluminescence), the electromagnetic radiation source may, in one embodiment, be integrated with, or attached to, a housing containing imaging system 200 (or part thereof). Said electromagnetic radiation source may for example be a light source, an infrared radiating source, and/or an UV radiating source. In one embodiment, the electromagnetic radiation source is an illumination source controlled by, or together with, system 200.

Electromagnetic radiation 20 coming from object 10 usually contains radiation of more than one wavelength, especially when object 10 is authentic. That is, radiation 20 is usually polychromatic in the broad sense of the term, i.e. not necessarily limited to visible colours. Radiation 20 may for example be in any wavelength range encompassed between 180 nm (UV radiation) and 2500 nm (infrared radiation), i.e. in the visible light range and/or outside that range (for example in the near-infrared (NIR) or short-wavelength infrared (SWIR) range). The portion of radiation 20 reaching arrangement 30 that is actually dispersed may depend on the characteristics of the optical element(s) forming arrangement 30. For example, long pass filter may be used to select the spectral range to be analysed.

Furthermore, dispersive imaging arrangement 30 is positioned relative to image sensor arrangement 60 in such a manner as to allow arrangement 60 to image, in one imaging period, dispersed electromagnetic radiation 50.

An example of image sensor that may be used in some embodiments of the invention is: a ⅓-Inch Wide-VGA CMOS Digital Image Sensor MT9V022 from ON Semiconductor, based in Phoenix, Ariz., U.S. That sensor has 752-by-480 pixels with size 6 μm forming active imager size with dimensions of 4.51 mm×2.88 mm and diagonal of 5.35 mm.

Figure 39:
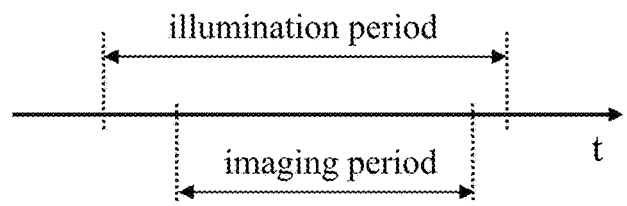
FIG. 39 schematically illustrates an example of imaging period and illumination period, in one embodiment of the invention.

An imaging period is here defined as being the period during which dispersed electromagnetic radiation 50 is acquired (as illustrated by FIG. 39).

In one embodiment, the imaging period has a duration having a value selected from the range of 5 to 1200 ms, and preferably selected from the range of 10 to 800 ms, such as for example 10, 20, 30, 50, 75, 100, 150, 200, or 300 ms.

An illumination period (as illustrated by FIG. 39) is here defined as being a period during which illumination conditions are considered sufficiently constant for the purpose of imaging dispersed electromagnetic radiation 50, and generating a measure of authenticity based thereof.

The portion of electromagnetic radiation 20 illuminating and passing through dispersive imaging arrangement 30 (therefore being at least dispersed in one set of directions, and being optionally non-dispersed in another set of directions) that is then actually detected by image sensor arrangement 60 depends on the characteristics of its image sensor (s). The electromagnetic radiation detected by the image sensor(s) may for example be in any wavelength range encompassed between 180 nm (UV radiation) and 2500 nm (infrared radiation), i.e. in the visible light range and/or outside that range (for example in the near-infrared (NIR) or short-wavelength infrared (SWIR) range). In that example, the lower limit of 180 nm may be imposed by material constraints of both dispersive imaging arrangement 30 and image sensor(s) 60, whereas the upper limit of 2500 nm may for example be imposed by the spectral response of indium gallium arsenide-based (GaInAs) infrared detectors. In one embodiment, the electromagnetic radiation detected by image sensor(s) 60 is in the range of visible light. In one embodiment, the electromagnetic radiation detected by image sensor(s) 60 is in the wavelength range of 180 nm to 2500 nm, more preferably in the range of 400 nm to 1000 nm.

Yet furthermore, imaging system 200 is configured for, after image sensor arrangement 60 has imaged dispersed electromagnetic radiation 50 in at least one imaging period, generating a measure of authenticity of object 10 depending at least on a relation between the imaged dispersed electromagnetic radiation and reference spectral information. System 200 thus enables the verification of whether, and/or the extent to which, the relation between the imaged dispersed electromagnetic radiation and the reference spectral information, which represents the expected spectral composition of electromagnetic radiation 20 coming from object 10, is in accordance with the expected underlying physics of the system, in a situation in which some information is known (or assumed to be known) about object 10 and/or mark 11 from which electromagnetic radiation 20 is coming (by reflection and/or emission). This means that some spatial information about electromagnetic radiation 20 prior to dispersion is known or assumed, such as for example spatial information about the type, form, shape, dimension, or other properties of a mark, sign, code, or pattern that object 10 bears and from which radiation 20 is coming. If the relation matches the expected underlying physics of the system, object 10 is likely to be authentic. Otherwise, it is more likely to be a counterfeit. System 200 thus enables a form of material-based authentication, such as for example at least one of: a) material-based authentication of the ink used to create a mark 11 printed on object 10, and b) material-based authentication of object 10 itself especially if object 10 is luminescing with a specific emission spectrum or has a specific reflection or absorption spectrum.

The nature of the relation that is looked at, i.e. the relation between the imaged dispersed electromagnetic radiation, the reference spectral information, and the known or assumed spatial information about the electromagnetic radiation before dispersion, i.e. information about mark 11 on object 10 (this spatial information is not required to be imaged by image sensor arrangement 60, but, in some embodiments, may), may be understood in the following sense. If the reference spectral information corresponds, substantially corresponds, or plausibly corresponds to the spectral composition of electromagnetic radiation 20 coming from imaged object 10, the imaged dispersed electromagnetic radiation typically resembles (non-linear effects may also need to be taken into account) the result of the convolution of the electromagnetic radiation before dispersion (i.e. information about mark 11 on object 10) with the reference spectral information, in which case object 10 is likely to be authentic. In contrast, if the reference spectral information does not correspond or does not plausibly correspond to the spectral composition of radiation 20 coming from imaged object 10, the imaged dispersed electromagnetic radiation typically noticeably differs from the result of the convolution of the electromagnetic radiation before dispersion (i.e. information about mark 11 on object 10) with the reference spectral information, in which case object 10 is likely to be a counterfeit.

More generally, the nature of the relation that is looked at, i.e. the relation between the imaged dispersed electromagnetic radiation, the reference spectral information, and the known or assumed spatial information about the non-dispersed electromagnetic radiation (as mentioned above, this spatial information is not required to be imaged by image sensor arrangement 60, but, in some embodiments, may), may also significantly differ from a mere convolution, considering the existence of non-linear effects. The nature of the relation may be determined a) based on the underlying physics and geometry, b) empirically, and/or c) by simulation (for example, using raytracing methods of commercially available solutions, such as e.g. Zemax optical design program, available from Zemax, LLC, based in Redmond, Wash., U.S.).

The underlying physics and geometry may include (i) the properties of dispersive imaging arrangement 30, image sensor arrangement 60, the transmission medium in between, etc., and (ii) effects of stretch of the image in the direction of the dispersion (y axis), which may be compensated for by mapping of the y axis of the image to a new y' axis using a non-linear function. The image may be stretched due to 1) non-linear dispersion of the grating, 2) projection distortions, and/or 3) optics-specific field aberrations.

The non-linear effects may also, in one embodiment, be modelled as a relation between the dispersed image, the non-dispersed spatial information, and the reference spectrum in a form being as close to linear translation-invariant (LTI) as possible. In such a case, the determination of the non-linear effects may be performed for example by a) acquiring several dispersed images of objects 10 with a known reference spectrum, and b) fitting the non-linear parameters to transform the relation to LTI.

One way to determine the non-linear effects, and therefore the nature of the relation to be looked at, may be a mathematical analysis of the optical system and determination of the correction that has to or should be applied to make the system LTI. This may be done using optical equations for example found in textbooks such as Yakov G. Sosking, "Field Guide to Diffractive Optics", SPIE, 2011. This may also be done numerically using optical software such as for example Zemax OpticStudio™, available from Zemax, LLC.

In one embodiment, dispersive imaging arrangement 30 disperses electromagnetic radiation 20 using, for example, a diffraction grating, and the imaged dispersed electromagnetic radiation is consequently the output of the diffraction grating imaged onto image sensor(s) 60. The diffraction grating structure may, in one embodiment, be optimized so that most radiation goes in the first order and the grating has almost no efficiency in the zero order. A synthetic non-dispersed image may be reconstructed using the imaged dispersed electromagnetic radiation and the expected electromagnetic spectrum (the reference spectral information), for example by deconvolution or by a deconvolution-like operation. A deconvolution algorithm based on fast Fourier transform (FFT) may for example be used. The algorithm may for example use a set of columns from the image extracted along the dispersion direction, comprising intensity profiles from the imaged dispersed electromagnetic radiation.

The reconstructed, synthetic non-dispersed image may then be assessed on its own and/or in view of the known or assumed spatial information about the electromagnetic radiation before dispersion (i.e. information about mark 11 on object 10), for the purpose of authenticating object 10. In one embodiment, generating the measure of authenticity further comprises determining at least one of:

a) a measure of decodability of an imaged machine-readable code in the result of the deconvolution or deconvolution-resembling operation (to take into account non-linear effects, as explained above);

b) a measure of sharpness of the result of the deconvolution or deconvolution-resembling operation;

c) a measure of blurriness of the result of the deconvolution or deconvolution-resembling operation;

d) a measure of the dimension of the result of the deconvolution or deconvolution-resembling operation;

e) a measure of the area of the result of the deconvolution or deconvolution-resembling operation;

f) a measure of the full width at half maximum of a cross-section of the result of the deconvolution or deconvolution-resembling operation; and g) a measure of the similarity of the result of the deconvolution or deconvolution-resembling operation, to a reference pattern.

In one embodiment, generating a measure of authenticity of object 10 comprises authenticating it, i.e. determining that it is likely to be authentic or not. In one embodiment, generating a measure of authenticity of object 10 comprises generating an authenticity measure (or index) such as for example a real value between 0 and 1, wherein '0' may mean "fully sure that the object is not authentic" and '1' may mean "fully sure that the object is authentic".

In practice, the authentication index typically does not reach the value '1' for all authentic objects (and '0' for all non-authentic ones). Hence, in one embodiment, a threshold between '0' and '1' is defined (for example a value comprised between 0.80 and 0.90, and in particular 0.85) above which the object is considered as authentic, and below which the object is considered as non-authentic. This threshold may for example be defined through measurements on a set of authentic and non-authentic objects. These measurements typically produce a bi-modal distribution of indexes (i.e., one part for the authentic objects concentrated towards the value '1' and one part for the non-authentic ones below, both separated by a gap). The robustness of the method is directly related to the extent to which the two parts (modes) of the index distribution are distant from one another. The threshold may then be placed in between either close to the index distribution of the authentic objects to minimize false positives or closer to the non-authentic index distribution to minimize false negatives.

If object 10 is, for example, a container or package containing some goods, the generated measure of authenticity may merely amount to a measure of authenticity of the goods determined through a mark or sign existing on the container or package (assuming that the container or package has not been tampered with), not necessarily directly enabling to authenticate the goods as such.

Since the dispersed form 50 of the electromagnetic radiation may be imaged in one imaging period, and since the imaging enables the reconstruction of a synthetic non-dispersed form of electromagnetic radiation based on reference spectral information, system 200 may be regarded as a form of snapshot imager in the sense that the scene is not scanned during the imaging process.

Figure 2:
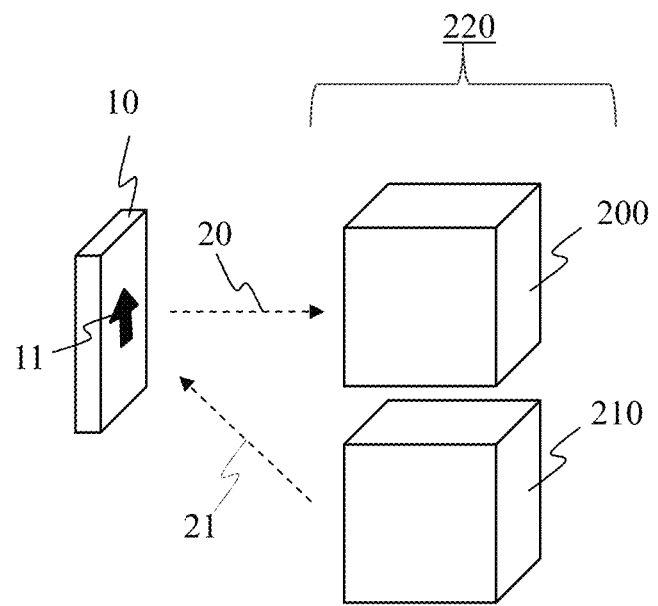
FIG. 2 schematically illustrates an object to be imaged and a system in one embodiment of the invention, wherein the system comprises both an imaging system and an illumination arrangement.

FIG. 2 schematically illustrates an object 10 to be imaged and a system 220 in one embodiment of the invention. System 220 comprises both an imaging system 200 (as described above with reference to FIG. 1) and an illumination arrangement 210. In one embodiment, system 220 forms a single device, such as for example a handheld, code reading and authentication device.

Illumination arrangement 210 generates electromagnetic radiation 21 for illuminating object 10. In one embodiment, radiation 21 has known parameters (e.g., spectrum, power, homogeneity, etc.) to allow excitation of e.g. luminescence emission spectra to allow disperse imaging of object 10 and/or mark 11 for authentication. As explained above with reference to FIG. 1, electromagnetic radiation 20 originates from object 10, and/or mark 11, and reaches imaging system 200.

In one embodiment, system 220 is connected to driving electronics and sensor reading electronics, so that, for example, image data outputted by imaging system 200 may be transferred to a processing unit for data treatment.

Figure 3:
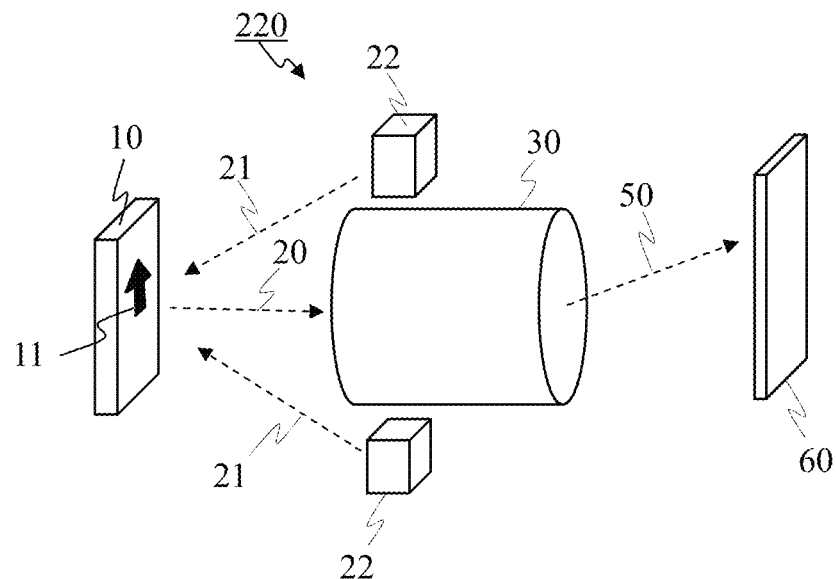
FIG. 3 schematically illustrates an object to be imaged and a system in one embodiment of the invention, wherein the system notably comprises illumination elements arranged around a dispersive imaging arrangement.

FIG. 3 schematically illustrates an object 10 to be imaged and a system 220 in one embodiment of the invention, as a possible implementation of the system illustrated on FIG. 2. System 220 notably comprises illumination elements 22 arranged around dispersive imaging arrangement 30. Although two illumination elements 22 are shown in FIG. 3, any number of illumination elements 22 may be provided, such as for example three, four or more. Furthermore, in one embodiment, illumination elements 22 are arranged symmetrically around dispersive imaging arrangement 30. The symmetric arrangement of illumination elements 22 around arrangement 30 is advantageous for homogeneous illumination of the target surface of object 10.

Figure 4:
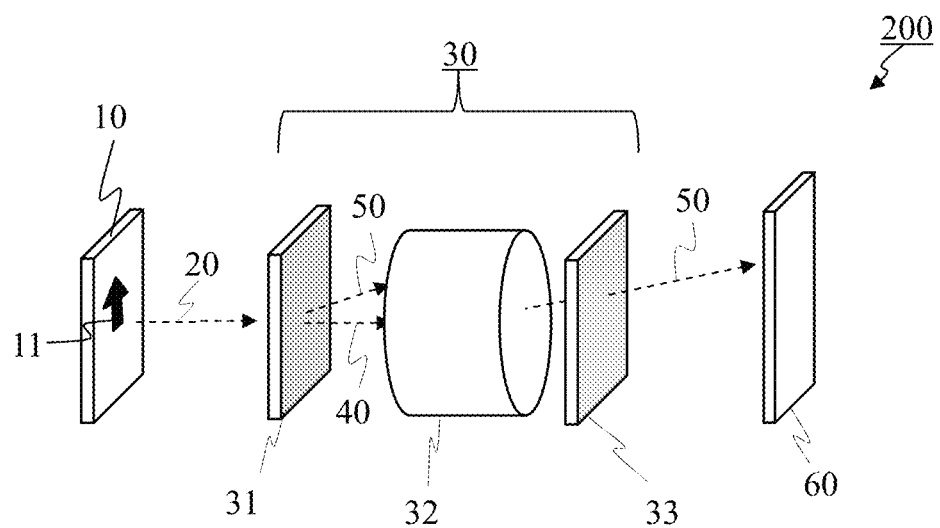
FIGS. 4 to 6 schematically illustrate three imaging systems and objects to be imaged, in three embodiments of the invention respectively.
Figure 5:
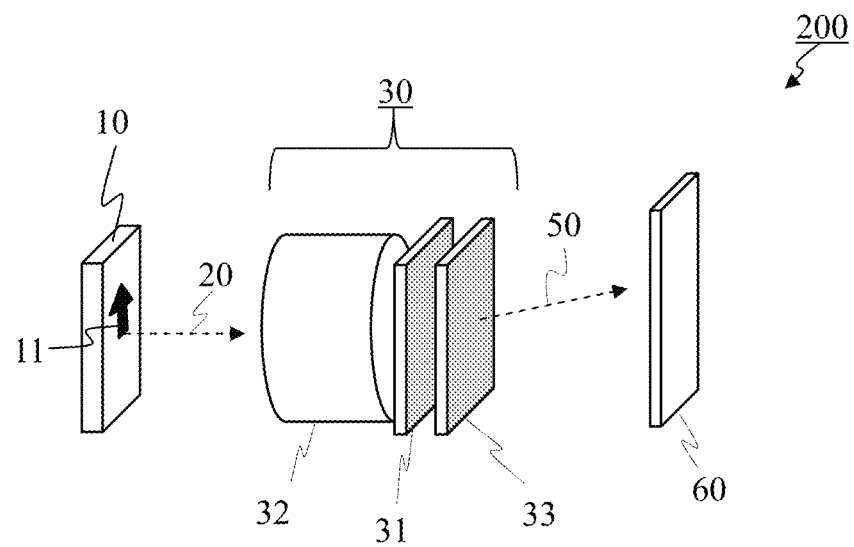
Figure 6:
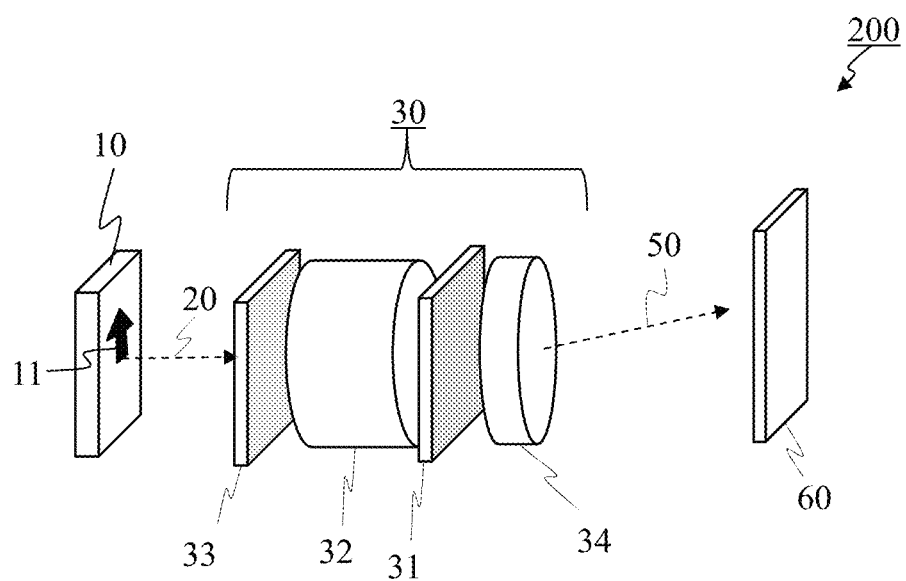

FIGS. 4 to 6 schematically illustrate three imaging systems 200 in three embodiments of the invention, respectively, showing possible components of dispersive imaging arrangement 30, such as a transmission grating 31, an imaging lens 32, an optical long-pass filter 33, and an additional lens arrangement 34.

Arrangement 30 of FIG. 4 comprises an imaging lens 32, a transmission grating 31 mounted in front of lens 32, and an optical long-pass filter 33 mounted behind lens 32. This enables to produce low optical aberrations by using the broad field-of-view of the lens objective.

In arrangement 30 of FIG. 5, both transmission grating 31 and optical long-pass filter 33 are mounted behind lens 32. This enables to cancel the dependence on the object position along the optical axis.

In the embodiment of FIG. 6, optical long-pass filter 33 is mounted in front of lens 32, and transmission grating 31 is mounted behind lens 32. Furthermore, an additional lens arrangement 34 is also mounted behind lens 32. This configuration enables to efficiently separate the dispersed image from the non-dispersed image (if any) and avoid dependence on the object position along the optical axis.

Figure 7:
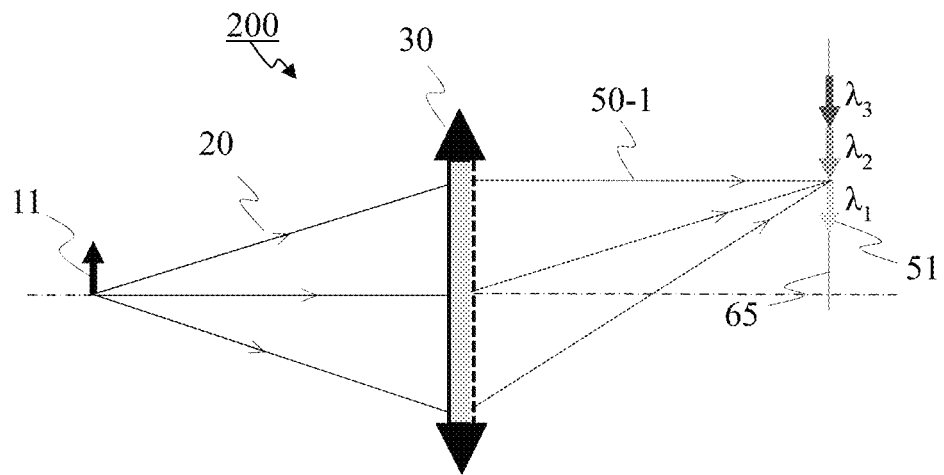
FIGS. 7 and 8 schematically represent, using a thin lens-grating approximation, two imaging systems and marks to be imaged, in two embodiments of the invention respectively.
Figure 8:
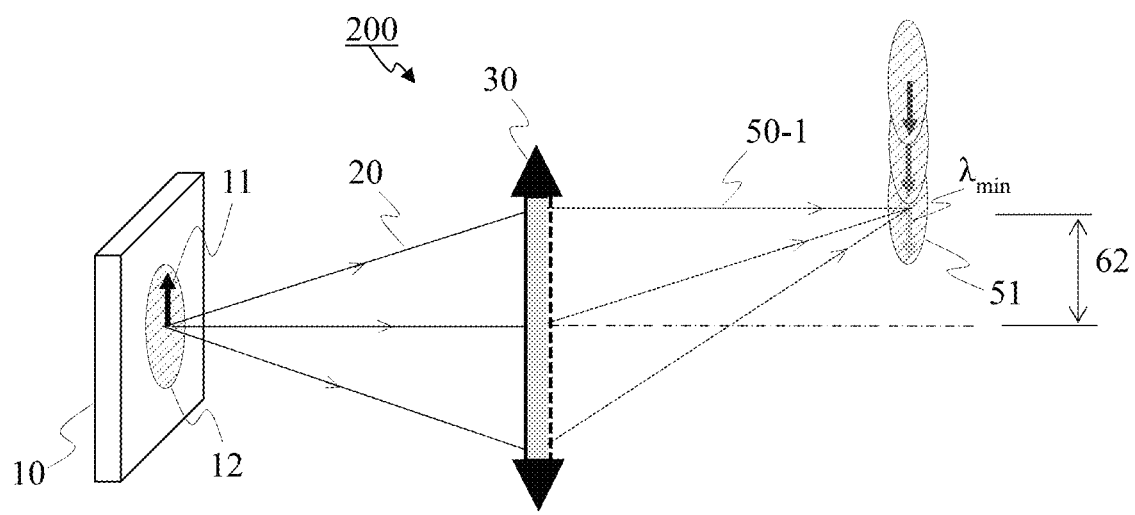

FIGS. 7 and 8 schematically represent, using a thin lens-grating approximation, two imaging systems 200 and marks 11 in two embodiments of the invention, respectively, to help understand the deflection of the first-order image relative to the optical axis and definition of minimum wavelength of a spectral range which is analysed to authenticate mark 11.

In FIG. 7, dispersive imaging arrangement 30 includes a lens, a transmission grating and a long-wavelength pass filter, to create the dispersed image on the image plane 65 where the image sensor(s) are positioned. Dispersed beams 50-1 are for the shortest wavelength $\lambda_1$ and create dispersed image 51 corresponding to wavelength $\lambda_1$.

Imaging system 200 receives electromagnetic energy 20 originating from object 10 to create a dispersed part, which is shifted compared to the optical axis (along which non-dispersed beams may optionally propagate) and is blurred by the spectrum of electromagnetic energy 20 impinging arrangement 30. The minimum shift depends on the minimum wavelength present in the spectrum emitted by object 10 or depends on the minimum wavelength transmitted through arrangement 30. The minimum shift may also depend on some grating and system parameters (e.g. grooves density, order, and incident angle) which parameters define the angular dispersion of the grating.

The three discrete dispersed images of mark 11 on FIG. 7 correspond to discrete wavelengths $\lambda_1$, $\lambda_2$ and $\lambda_3$. These discrete wavelengths can therefore be conveniently resolved since the corresponding images do not overlap.

FIG. 8 shows the imaging of an area 12 of object 10, wherein area 12 contains a printed mark 11, which may be in any position or orientation. If mark 10 is outside area 12, imaging system 200 should be repositioned so as to have mark 11 within area 12. Dispersed image 51 of area 12 contains the image of mark 11.

Image 51 corresponds to the minimum wavelength $\lambda_{min}$ that can be transmitted by the system and defined by a cut-on wavelength of a long pass filter of arrangement 30. Reference 62 shows the deflection relative to the optical axis in the image plane.

In one embodiment, illumination arrangement 210 (not illustrated on FIG. 8) illuminates only the portion of object 10 corresponding to area 12. Illumination arrangement 210, together with an optional protective cover (as mentioned above), may be designed to prevent ambient light from reaching area 12, thus providing better conditions for code reading and authentication.

Although, in the above-discussed embodiments, the non-dispersed (zero-order) radiation is not used (or not necessarily used) for authentication, it is in any event advantageous to avoid overlapping of the zero- and first-order when arrangement 30 does produce both zero- and first-order parts. Indeed, if the order separation is not sufficient, the dispersed images may be affected by part of an overlapping zero-order image. To avoid such a situation, a mask may be used to reduce the size of the area 12 of object 10 that is being imaged.

The embodiments that are not using the non-dispersed (zero-order) radiation for authentication are advantageous notably in that the optical aberrations for the first order may be optimized without consideration for any degradation of the aberrations in the zero order. In other words, only acceptable optical aberrations for the first order are needed. In addition, the embodiments that are not using the non-dispersed (zero-order) radiation for authentication are also advantageous in that there is no requirement to acquire both zero- and first-order images, so that larger first-order image may be acquired of an image sensor of a given size.

Figure 9A:
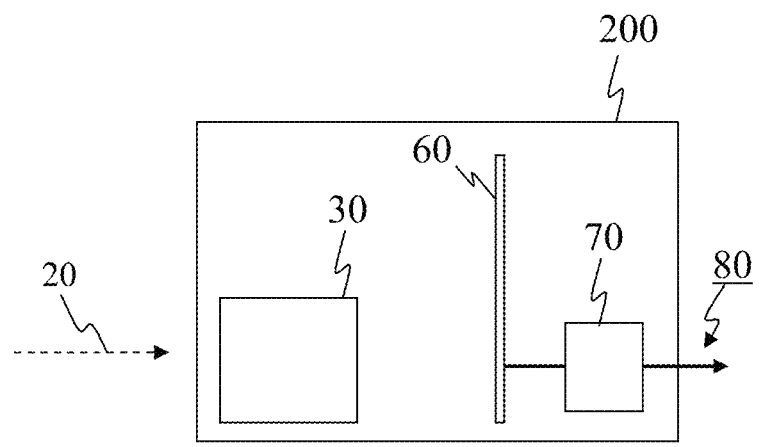
FIG. 9a schematically illustrates an imaging system in one embodiment of the invention, wherein the imaging system is an imaging device.

FIG. 9a schematically illustrates an imaging system 200 in one embodiment of the invention, which differs from imaging system 200 of FIG. 1 in that system 200 of FIG. 9a specifically consists in a single imaging device. In addition to dispersive imaging arrangement 30 and image sensor arrangement 60 described with reference to FIG. 1, system 200 comprises a processing unit 70 configured for receiving data representing the imaged dispersed electromagnetic radiation (as detected by arrangement 60), generating the measure of authenticity as described with reference to FIG. 1, and outputting information 80 representing the generated measure of authenticity to any kind of user interface of the imaging device and/or to an output port for transmission to one or more other external devices (not shown in FIG. 9a).

In one embodiment, the imaging device making up imaging system 200 of FIG. 9a is a hand-held device. Such an imaging device can therefore be regarded as a hand-held audit device capable of generating a measure of authenticity of an object, and providing the authenticity measure to, for example, the device's operator.

Figure 9B:
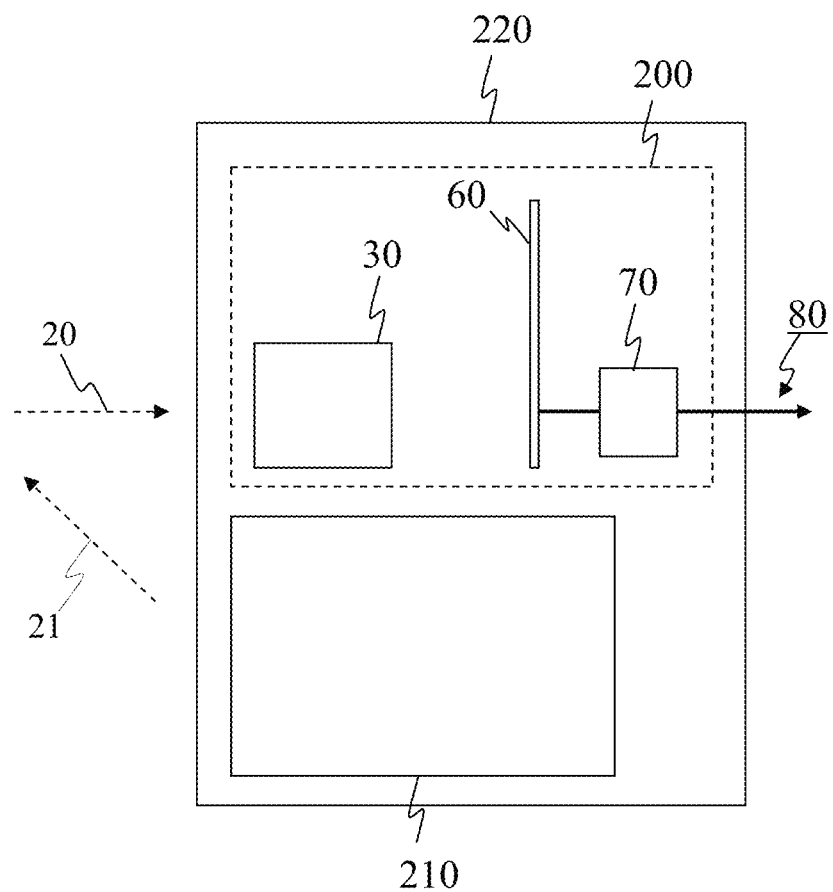
FIG. 9b schematically illustrates a system in one embodiment of the invention, wherein the system comprises both an imaging system and an illumination arrangement, and wherein the system is an imaging device.

FIG. 9b schematically illustrates a system 220 in one embodiment of the invention, wherein system 220 comprises both an imaging system 200 and an illumination arrangement 210, and wherein system 220 is an imaging device. In other words, the embodiment of FIG. 9b may be regarded a combination of the embodiments described with reference to FIGS. 9a and 2. In one embodiment, the imaging device making up system 200 of FIG. 9b is a hand-held device.

Figure 10A:
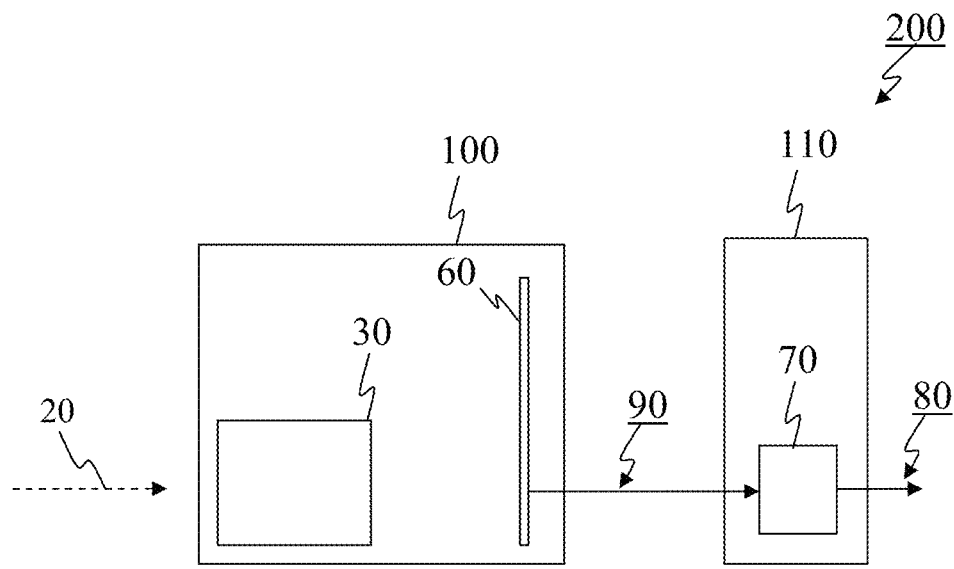
FIG. 10a schematically illustrates an imaging system in one embodiment of the invention, wherein the imaging system comprises an imaging device and said imaging device comprises an image sensor arrangement and a dispersive imaging arrangement, but said imaging device is not configured to actually generate the measure of authenticity.

FIG. 10a schematically illustrates an imaging system 200 in one embodiment of the invention, which differs from imaging system 200 of FIG. 1 in that system 200 of FIG. 10a is shown as specifically comprising more than one device. Namely, in the example of FIG. 10a, system 200 comprises two devices: on the one hand, an imaging device 100 comprising dispersive imaging arrangement 30 and image sensor arrangement 60 described with reference to FIG. 1, and, on the other hand, a processing device 110 comprising a processing unit 70. Processing device 110, rather than imaging device 100, generates the measure of authenticity (as described with reference to FIG. 1). To do so, data 90 representing the imaged dispersed electromagnetic radiation is transmitted from imaging device 100 to processing device 110. Data 90 may be transmitted on any suitable wired or wireless channel using any transmission format (such as for example using Internet Protocol (IP) packets, optionally encrypted). Then, within processing device 110, the measure of authenticity is generated by processing unit 70, and information 80 representing the generated measure of authenticity may then be outputted to a user interface of processing device 110 and/or to an output port for transmission to one or more other external devices (not shown in FIG. 10a).

Figure 10B:
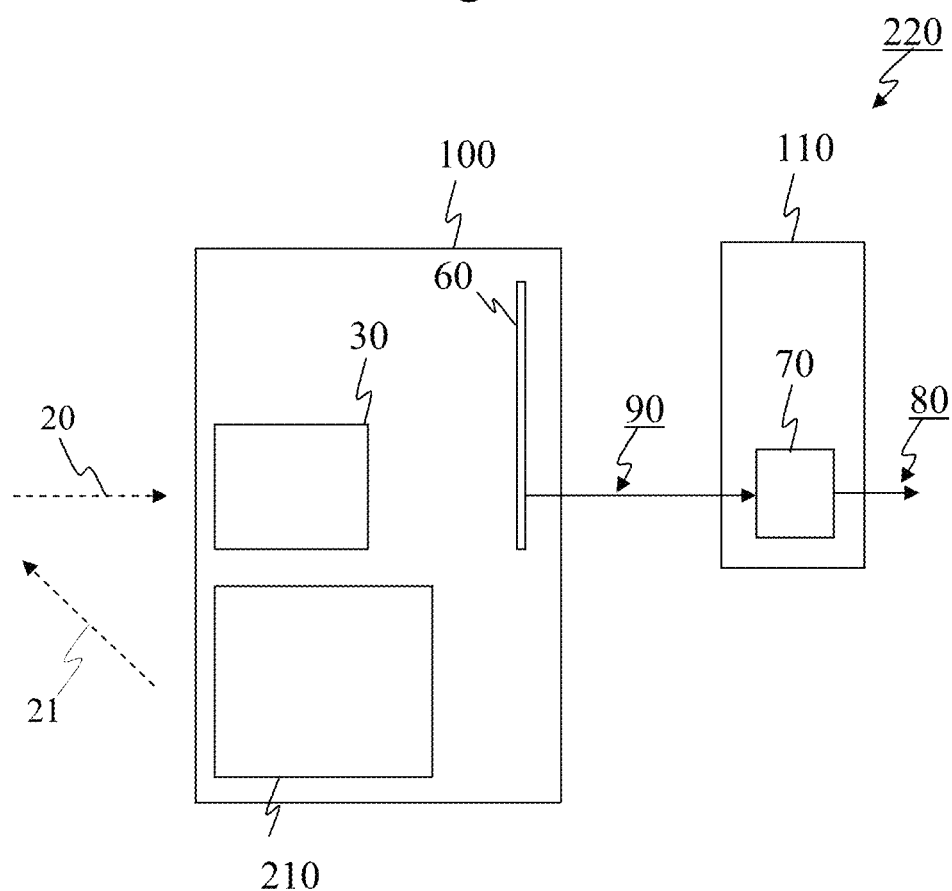
FIG. 10b schematically illustrates a system in one embodiment of the invention, wherein the system comprises an imaging device and said imaging device comprises an image sensor arrangement, a dispersive imaging arrangement and an illumination arrangement, but said imaging device is not configured to actually generate the measure of authenticity.

FIG. 10b schematically illustrates a system 220 in one embodiment of the invention, wherein system 220 comprises an imaging device 100 and said imaging device 100 comprises an image sensor arrangement 30, a dispersive imaging arrangement 60 and an illumination arrangement 210, but imaging device 100 is not configured to actually generate the measure of authenticity. In other words, the embodiment of FIG. 10b may be regarded a combination of the embodiments described with reference to FIGS. 10a and 2.

In one embodiment, imaging device 100 of any one of FIGS. 10a and 10b is a hand-held device.

In one embodiment, processing unit 70 of any one of FIGS. 9a, 9b, 10a and 10b forms part of a computing unit such as for example the one illustrated with reference to FIG. 38 (which is discussed below). In such a case, processing unit 70 of FIG. 9a or 9b and processing unit 503 of FIG. 38 may actually be the same element. Likewise, in such a case, processing unit 70 of FIG. 10a or 10b (within processing device 110) and processing unit 503 of FIG. 38 may actually be the same element.

In some embodiments, the imaging device making up imaging system 200 of FIG. 9a or 9b, or imaging device 100 illustrated in FIG. 10a or 10b comprises a handle integrally formed with the housing, or attached thereto, to enable an operator to hold the imaging device towards to the object to be imaged and authenticated.

In one embodiment, the imaging device making up imaging system 200 of FIG. 9a or making up system 220 of FIG. 9b, or imaging device 100 illustrated in any one of FIGS. 10a and 10b further comprises a storage unit (not shown in any of FIGS. 9a, 9, 10a, and 10b) for storing, for example, the reference spectral information which is known in advance and used for generating the measure of authenticity. The reference spectral information may be stored in the form of a reference spectral profile.

Figure 11:
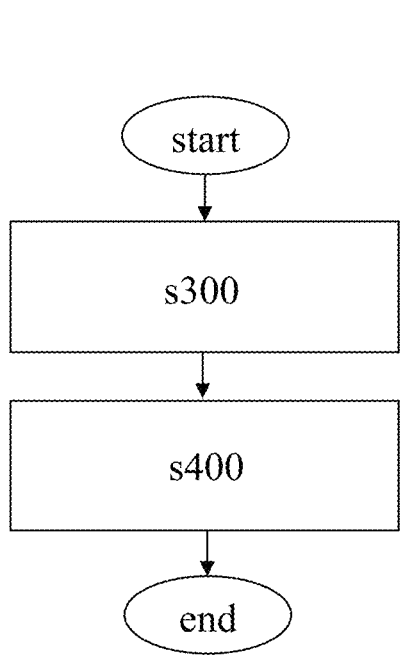
FIG. 11 is a flowchart of an imaging method in one embodiment of the invention.

FIG. 11 is a flowchart of a method in one embodiment of the invention, which makes use of an image sensor arrangement 60 and a dispersive imaging arrangement 30, as described above with reference to FIGS. 1 to 10b. The method comprises the steps of imaging s300, by arrangement 60, in at least one imaging period, dispersed electromagnetic radiation 50, and generating s400 a measure of authenticity of object 10 depending at least on a relation between the imaged non-dispersed electromagnetic radiation and reference spectral information. Step s400 is carried out through convolution or deconvolution operation(s) (as discussed below with reference to FIG. 12) or through convolution-like or deconvolution-like operation(s) to take into account non-linear effects as explained above.

If imaging step s300 consists in imaging dispersed electromagnetic radiation 50 in a single illumination period, step s300 precedes generating step s400, usually without overlap. However, if step s300 consists in imaging dispersed electromagnetic radiation 50 in a plurality of illumination periods (typically under different illumination conditions), imaging step s300 and generating step s400 may overlap (not shown in FIG. 11). Namely, the process of generating s400 the measure of authenticity may begin based on image data recorded during one or more illumination periods while imaging step s300 is still under way.

Figure 12:
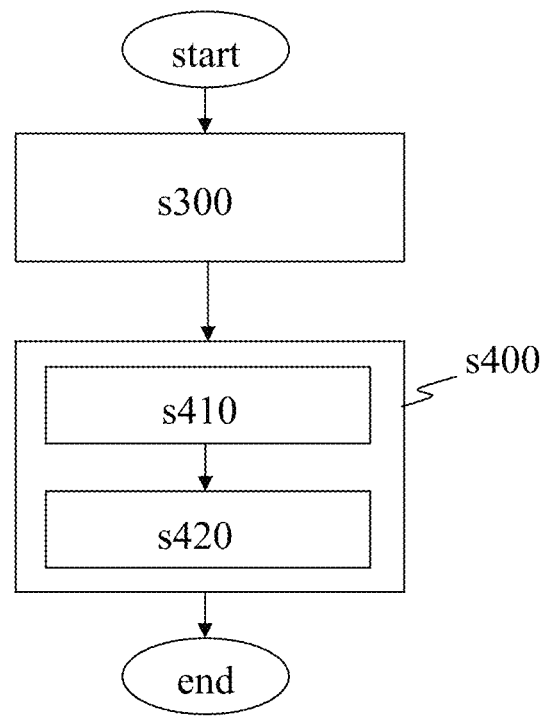
FIG. 12 is a flowchart of an imaging method in one embodiment of the invention, wherein generating the measure of authenticity comprises deconvolving the dispersed electromagnetic radiation by reference spectral information.

In one embodiment, generating s400 the measure of authenticity depends at least on the extent to which the result of the deconvolution of the imaged dispersed electromagnetic radiation by the reference spectral information meets or has certain properties or characteristics. In one embodiment, this may be implemented as illustrated by the flowchart of FIG. 12, with a step s410 of deconvolving the imaged dispersed electromagnetic radiation by the reference spectral information, thus outputting a reconstructed, synthetic non-dispersed image, and a step s420 of assessing the deconvolution result.

Figure 13:
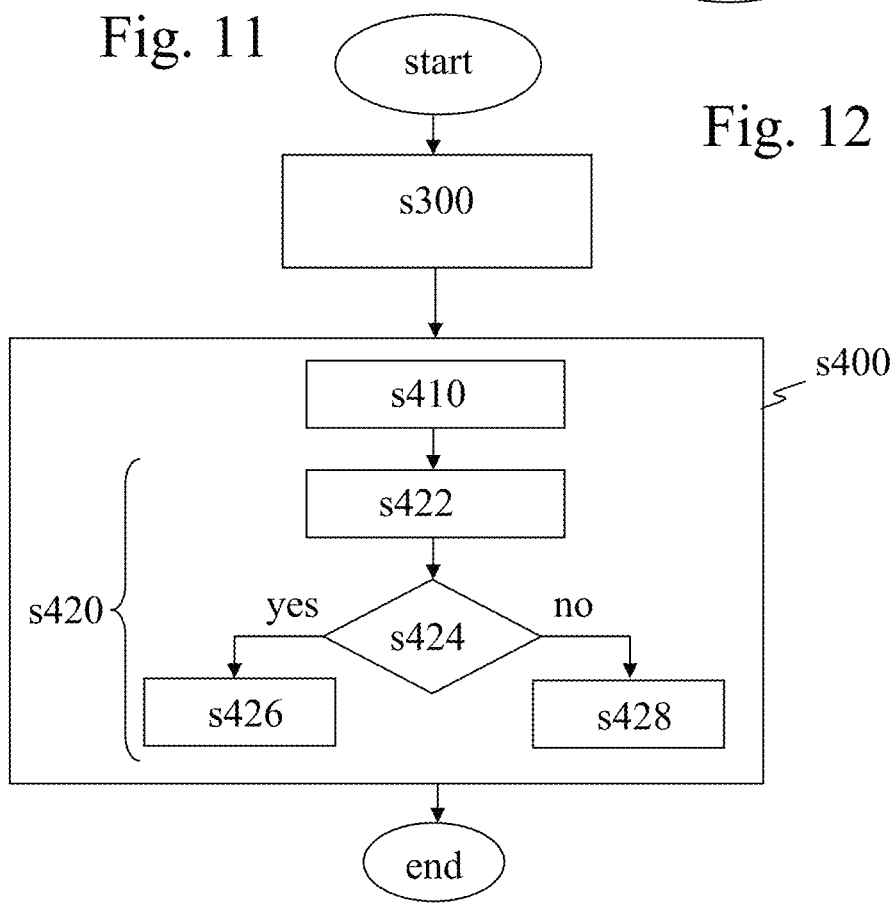
FIG. 13 is a flowchart of an imaging method in one embodiment of the invention, including an assessment as to whether a deconvolution result is decodable.

In one embodiment, as illustrated by the flowchart of FIG. 13, step s420 of assessing the deconvolution result is implemented by determining s422 a measure of decodability of a synthetically produced machine-readable code in the result of the deconvolution. If the decoding attempt s422 is successful s424 ("yes"), then object 10 is determined s426 to be likely authentic. By contrast, if the decoding attempt s422 is not successful s424 ("no"), then object 10 is determined s428 to be likely a counterfeit.

Figure 14:
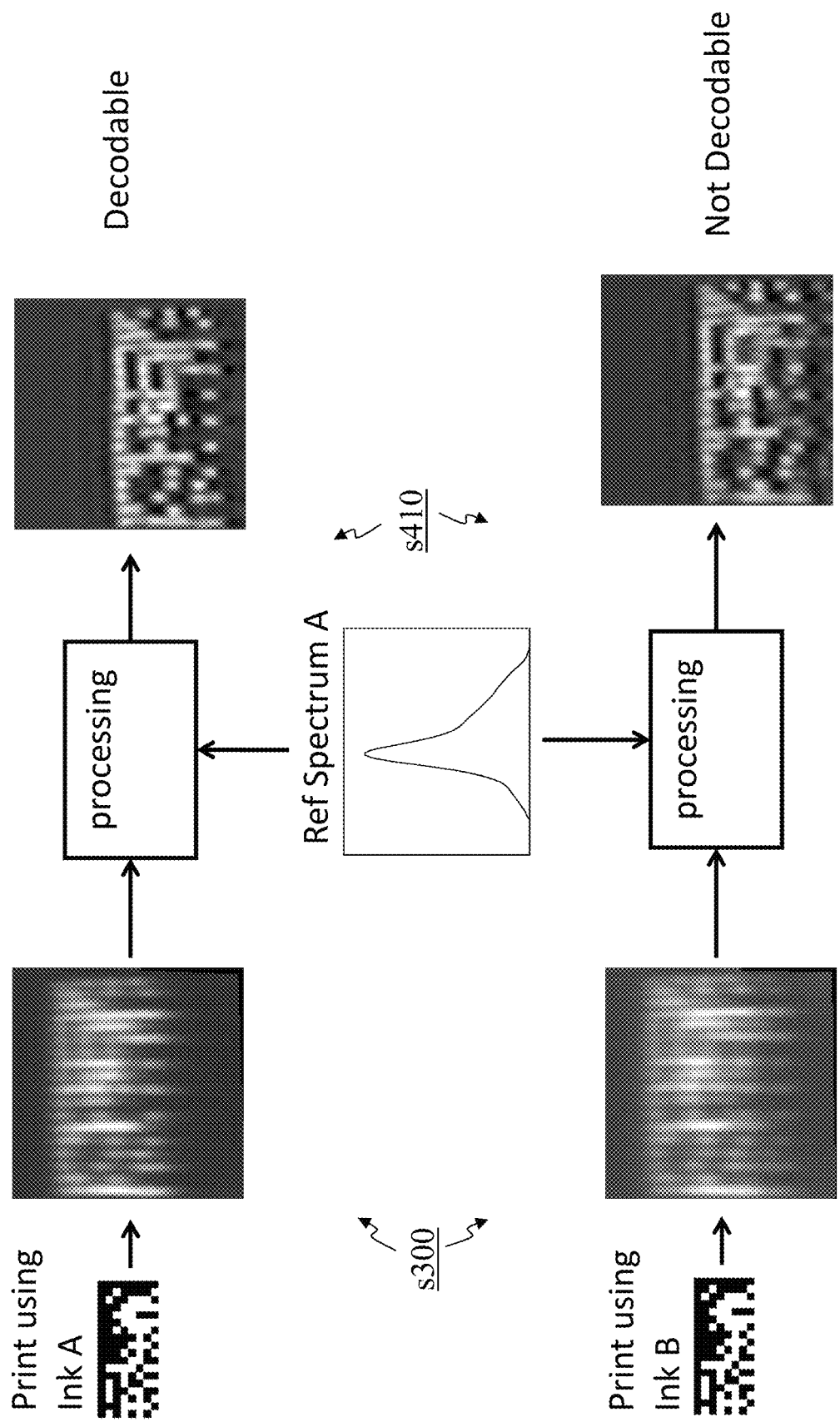
FIG. 14 schematically illustrates the processing of imaged dispersed electromagnetic radiation for the purpose of authentication, in one embodiment of the invention, wherein the object bears a two-dimensional matrix barcode.

FIG. 14 schematically illustrates a method in one embodiment of the invention, in which a decodability assessment is performed to generate s400 a measure of authenticity of an object 10. Two identical codes are shown on the left-hand side, wherein the first code has been printed using ink A (upper left) and the second code has been printed using ink B (lower left). Dispersed electromagnetic radiation 50 is then imaged s300 by image sensor arrangement 60. The respective dispersed image is then processed s410 by means of a deconvolution or a deconvolution-resembling operation (to account for non-linear effects) based on the reference spectral information representing the spectrum of ink A ("Ref Spectrum A") to output a reconstructed, synthetic non-dispersed image (which is respectively illustrated on the right-hand side of FIG. 14). It can be observed that the reconstructed, synthetic non-dispersed image on the upper right of FIG. 14, which has been generated based on the imaged dispersed form of the code printed using ink A and the reference spectral information representing the spectrum of ink A, is decodable. It can be observed that, by contrast, the reconstructed, synthetic non-dispersed image on the lower right of FIG. 14, generated based on the imaged dispersed form of the code printed using ink B and the reference spectral information representing the spectrum of ink A, is not decodable. The code is not decodable because the spectral information differs from the authentic one and hence the deconvolution produces a distorted synthetic image of the code, which quality is insufficient for successful decoding.

This decodability determination s420 may lead or amount to a determination that the object having a non-decodable code (after the above-described processing) is fake or likely to be fake, whereas the object having a decodable code is authentic or likely to be authentic.

Figure 15:
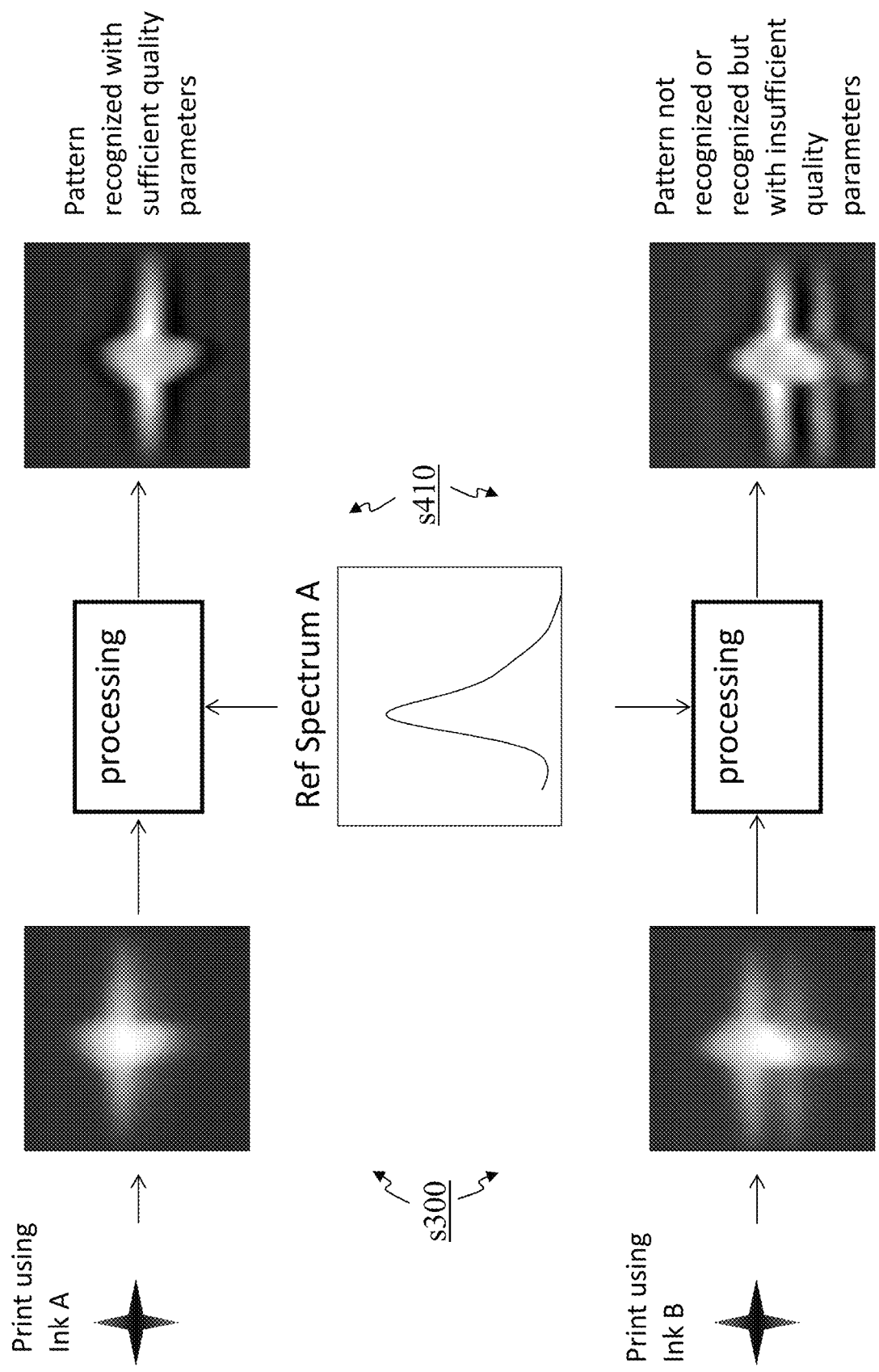
FIG. 15 schematically illustrates the processing of imaged dispersed electromagnetic radiation for the purpose of authentication, in one embodiment of the invention, wherein the object bears a printed pattern (being a star-shaped logo)

FIG. 15 schematically illustrates a method in one embodiment of the invention, in which an assessment is also performed to generate s400 a measure of authenticity of an object 10. Two identical patterns (i.e., a four-pointed star-shaped sign) are shown on the left-hand side, wherein the first pattern has been printed using ink A (upper left) and the second pattern has been printed using ink B (lower left). Dispersed electromagnetic radiation 50 is then imaged s300 by image sensor arrangement 60 (see images on the left-hand side of FIG. 15). The respective dispersed image is then processed s410 by means of a deconvolution or a deconvolution-resembling operation based on the reference spectral information representing the spectrum of ink A ("Ref Spectrum A") to output a reconstructed, synthetic non-dispersed image (see images on the right-hand side of FIG. 15). It is then determined that the reconstructed, synthetic non-dispersed image on the upper right of FIG. 15, which has been generated based on the imaged dispersed form of the pattern printed using ink A and the reference spectral information representing the spectrum of ink A, has a pattern which can be recognized and has parameters representing a sufficient image quality, for example in terms of sharpness or blurriness. It is determined that, by contrast, the reconstructed, synthetic non-dispersed image on the lower right of FIG. 15, generated based on the imaged dispersed form of the pattern printed using ink B and the reference spectral information representing the spectrum of ink A, has a pattern which cannot be recognized or which can be recognized but has parameters representing an insufficient image quality, for example in terms of sharpness or blurriness.

This recognition and parameter-based quality determination may lead or amount to a determination that the object having the pattern printed with ink B is fake or likely to be fake (determination after the above-described processing: non-recognizable pattern, or recognizable pattern but having insufficient quality parameters), whereas the object having the pattern printed with ink A is authentic or likely to be authentic (determination after the above-described processing: recognizable pattern having sufficient quality parameters).

Figure 16:
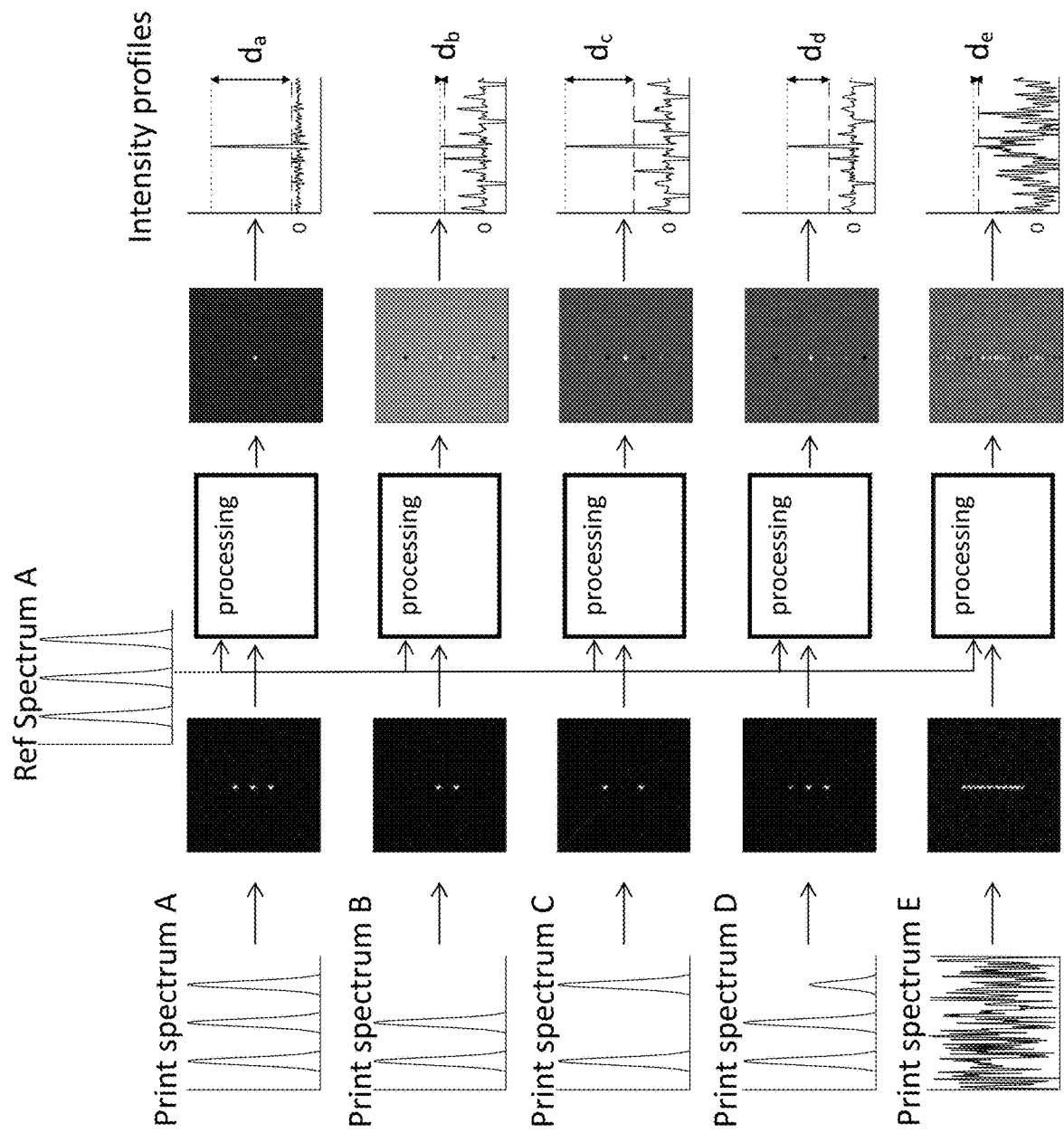
FIG. 16 schematically illustrates the processing of different imaged dispersed electromagnetic radiation for the purpose of authentication, in one embodiment of the invention.
Figure 17:
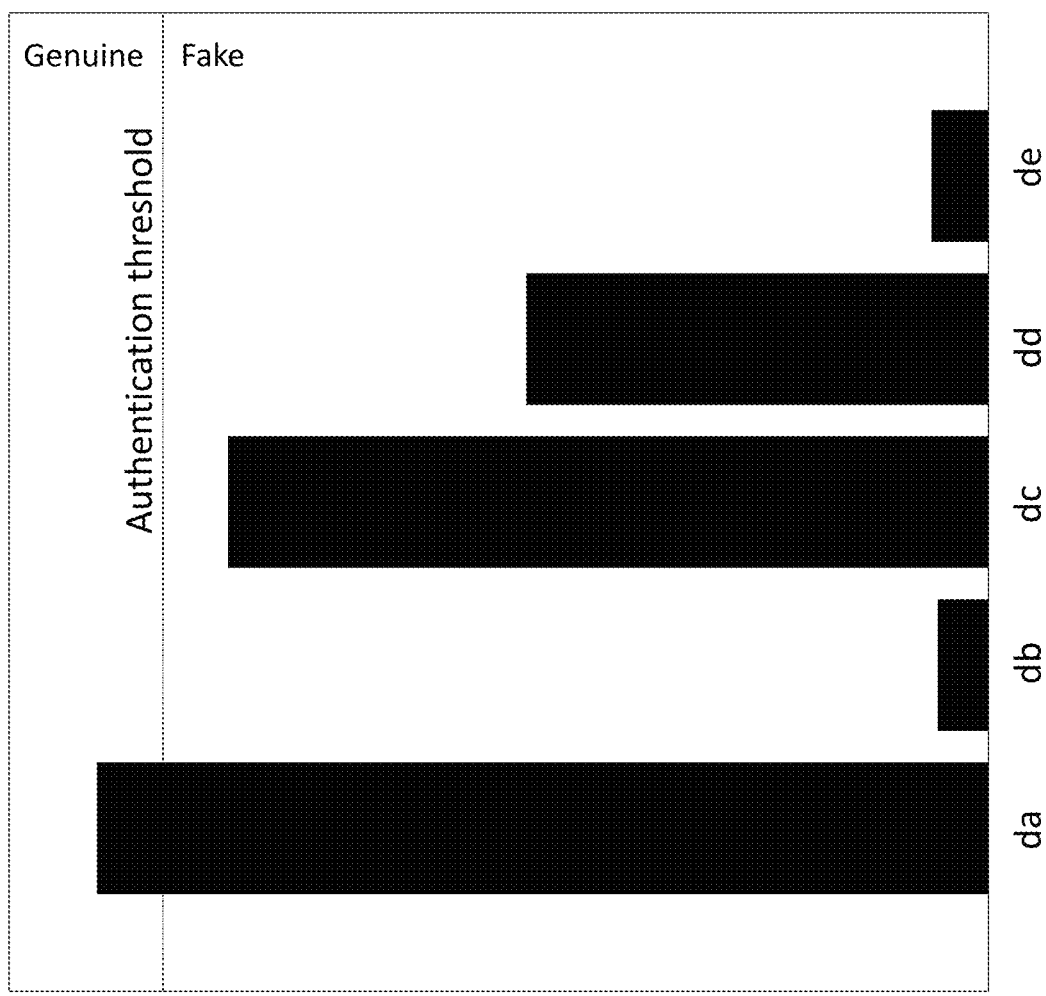
FIG. 17 shows computed authentication parameters, or measures of authentication, corresponding to the five spectrum profiles of FIG. 16, in one embodiment of the invention.

FIG. 16 schematically illustrates an exemplary implementation of a method in one embodiment of the invention, in which, in particular, images of dispersed electromagnetic radiation from five objects printed with different inks—with ink spectrum A to E respectively—are processed for the purpose of authentication. Dispersed electromagnetic radiation 50 associated with the five objects are imaged (images on the left-hand side of FIG. 16). The respective dispersed image is then processed by means of a deconvolution or a deconvolution-resembling operation based on the reference spectral information representing the spectrum of ink A ("Ref Spectrum A") to output a reconstructed, synthetic non-dispersed image (images on the right-hand side of FIG. 16). It is then determined that the reconstructed, synthetic non-dispersed image has a value d (computed authentication parameter or measure of authentication) which is above or below a threshold, as shown in FIG. 17. To do so, the intensity profile of the central column of each of the reconstructed, synthetic non-dispersed images is used for generating the measure of authenticity. This determination may lead or amount to a determination that an object is fake or likely to be fake, or, rather, authentic or likely to be authentic.

In one embodiment, hereinafter referred to as "embodiment E1" (not illustrated in the drawings), a DataMatrix code, or any kind of machine readable code, is printed on object 10 using an ink having a reference spectrum (reflectance or luminescence). After imaging s300 the dispersed electromagnetic radiation (hereinafter referred to as the "first order image"), a measure of authenticity is generated s400 by deconvolving s410 the first-order image by the expected genuine ink response (reference spectrum) and therefore computing (reconstructing) a synthetic zero-order image. An attempt is then made s422 to decode the resulting zero-order image. If it can be decoded, object 10 is regarded as genuine. If it cannot be decoded, object 10 is regarded as non-genuine.

In one embodiment, decoding quality metrics returned by the decoder is used for generating the measure of authentication s420. Quality metrics (from ISO/IEC 15415 Barcode Print Quality Test Specification-2D Symbols, see p. 31ff in section 4.6.1.2 entitled "Parameters Measured and their Significance" of "GS1 DataMatrix Guideline, Overview and technical introduction to the use of GS1 DataMatrix", Release 2.2.1, Ratified, July 2015, retrieved from http://www.gsl.org/docs/barcodes/GS1_DataMatrixGuideline.pdf) may for example be at least one of:

a) Symbol contrast, which is "the difference between the highest and the lowest reflectance values in the profile—in simple terms the difference between the dark and light areas (including the Quiet Zones) as seen by the scanner." (from page 32 of above-referred GS1 DataMatrix Guideline)

b) Print growth (size of the cells in the reconstructed machine readable code), which "is not a graded parameter but is a very informative measure for the purposes of process control. It is a measure of how symbols may have grown or shrunk from target size. If the growth or shrinkage is too large, then scanning performance will be impacted." (from page 34 of above-referred GS1 DataMatrix Guideline)

c) Axial non-uniformity, which "measures and grades (on the 4 to 0 scale) the spacing of the mapping centres and tests for uneven scaling of the symbol along the X or Y axis" (from page 32 of above-referred GS1 DataMatrix Guideline); and d) Modulation, which "is related to Symbol Contrast in the sense that it measures the consistency of the reflectance of dark to light areas throughout the symbol" (from page 32 of above-referred GS1 DataMatrix Guideline).

In one embodiment, a voting approach taking into account several of these metrics with different weight is used to generate the authenticity measure. This enhances the robustness.

In one embodiment, hereinafter referred to as "embodiment E2" (as illustrated by FIG. 15), a patch, logo, and/or marking, the exact shape of which is known in advance, is printed on object 10. After imaging s300 the dispersed electromagnetic radiation (hereinafter referred to as the "first order image"), a measure of authenticity is generated s400 by deconvolving s410 the first order image by the expected genuine ink response (reference spectrum) and thus computing (reconstructing) a synthetic zero-order image. The reconstructed zero-order image is then assessed s420 by applying standard image processing quality metrics such as at least one of: sharpness, intensity of the first derivative, contrast, and dynamic range.

In one sub-embodiment, these quality metrics may be applied separately in the direction collinear with the diffraction, or dispersion, direction and the direction perpendicular to the diffraction, or dispersion, direction. The metrics such as sharpness are typically not altered by the diffraction, or dispersion, when measured perpendicular to the diffraction, or dispersion, direction. But the metrics may be altered in the direction collinear to diffraction, or dispersion, for a non-genuine mark. The two metrics in the respective two directions are similar when the reference spectrum matches the printed one and dissimilar otherwise. A threshold on the similarity may classify the result of genuine/non genuine.

In one sub-embodiment, these quality metrics may be applied in the direction collinear with the diffraction, or dispersion, direction only. A simple threshold on the metrics may suffice to classify the result to genuine or non-genuine.

The confidence level of the result of a pattern matching algorithm using the reconstructed synthetic non-dispersed pattern may also be used as a measure of authenticity.

In one embodiment, hereinafter referred to as "embodiment E3" (not illustrated in the drawings), a small dot is printed on object 10 using an ink that has several distinct spectral peaks. After imaging s300 the dispersed electromagnetic radiation (hereinafter referred to as the "first order image"), a measure of authenticity is generated s400 by deconvolving s410 the first order image by the expected genuine ink response (reference spectrum) and thus computing (reconstructing) a synthetic zero-order image. If the reconstructed synthetic zero-order image results in a single dot, the printed ink spectrum matches the reference spectrum and the marking is considered authentic. The analysis of the intensity profile of the reconstructed dot may also provide metrics to determine if the marking is genuine or not.

In one embodiment, hereinafter referred to as "embodiment E4" (not illustrated in the drawings), the marking on object 10 is a solid print, i.e. a uniform deposition of ink without any pattern or modulation of thickness. A transition between an area containing the printed ink and an area not printed is advantageous to generate some variation in the first-order image to allow processing the intensity profile by deconvolution. The end of the nose of the imaging system may be in contact with the marking and may be equipped with a physical mask with holes, such has, for example: one big square hole, one rectangular hole, a star shaped hole, a grid of several holes of any shape. The mask may also be the edge of the nose end itself. The purpose of the mask is to create the missing modulation/transition in the printed mark. For the optical system, there is no difference if a lack of signal is due to an area without ink, or an area with ink but masked. After imaging s300 the dispersed electromagnetic radiation (hereinafter referred to as the "first order image"), a measure of authenticity is generated s400 by deconvolving s410 the first order image by the expected genuine ink response (reference spectrum) and thus computing (reconstructing) a synthetic zero-order image. The reconstructed zero-order image is then assessed s420 by applying image processing quality metrics such as those mentioned above in relation to embodiment E2.

The deconvolution step s420 is translation invariant with respect to the spectrum and the position of the first-order image on the sensor. This means that only the shape of the reference spectrum matters. The same shape but shifted at longer or shorter wavelength would produce the same computed zero-order image, but shifted. Therefore, there is typically no way to isolate the shift due the wavelength from a physical shift of the marking position under the imaging system. Embodiments E1, E2 and E3 typically suffer from this limitation. Embodiment E4 does not, however, since the modulation is not due to a modulated printing, but due to the mask, which position is fixed with respect to the optical system. Indeed, in embodiment E4, there is no way to shift the mask, thus no way to induce a physical shift of the position of the modulation under the imaging system. Therefore, the absolute position of the reconstructed, synthetic zero-order within the reconstructed image is only related to the absolute wavelength of the reference spectrum. This absolute position is an additional authentication element.

In one embodiment, the deconvolution operation of step s410 is performed per line of the image along the diffraction or dispersion direction. Furthermore, when deconvolution step s410 is carried out on a line-by-line manner, the result of the deconvolution may be then averaged to reduce noise and cancel possible modulation by the background non-uniformities, prior to comparing the result against the reference spectral information as part of step s420.

In one embodiment, the marking comprises at least one machine readable code, which may for example comprise at least one of a linear barcode and a matrix barcode (e.g., a printed Data Matrix code or QR code).

In one embodiment, the marking comprises single spectral characteristics at least over one region of the marking. The marking may also comprise single spectral characteristics over the whole marking.

In one embodiment, a mask is intentionally provided, as part of imaging system 200 and in addition thereto, on object 10 or in the vicinity thereof to reveal only a portion of object 10. This is advantageous in the case the whole object carries a substance having the reference spectral information or a large marking which covers the whole image. The mask artificially creates a transition from non-marked to marked area even if there would be no such transition without the mask.

FIGS. 18 to 21 provide further explanations regarding some embodiments of the invention, in particular regarding the advantages of using a mask.

Figure 18:
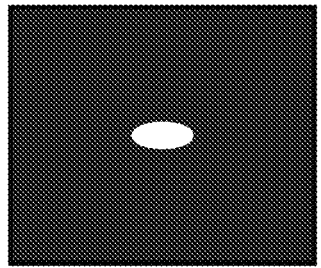
FIGS. 18 to 21 provide further explanations regarding some embodiments of the invention.
Figure 18:
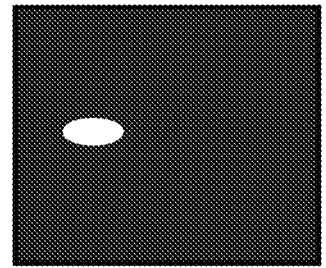
Figure 18:
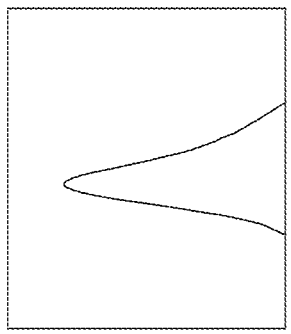
Figure 18:
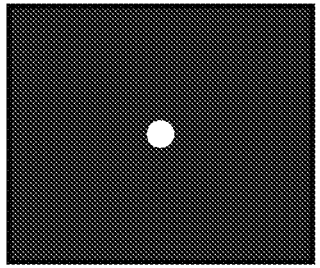
Figure 18:
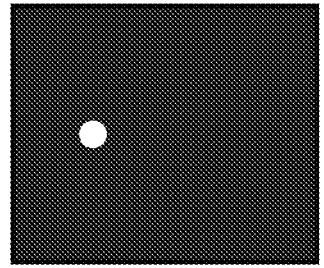

On the left-hand side of FIG. 18, two markings, i.e. markings A and B, are shown. They have the same shape but they are not located at the same position within the field of view of the system. The same ink has been used to print markings A and B. On the right-hand side of FIG. 18, the respective images on image sensor arrangement 60 after dispersion are shown. Both images sensed by image sensor arrangement 60 give the same shape but at different position. Therefore, the position within the image cannot be used as an authentication factor.

Figure 19:
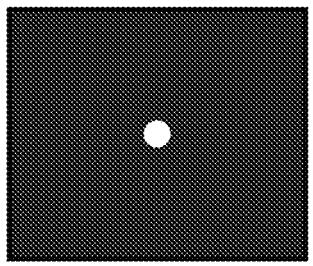
Figure 19:
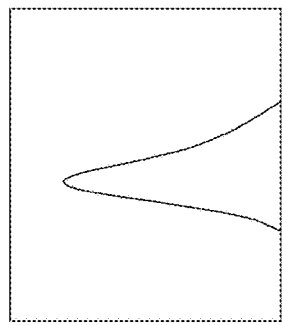
Figure 19:
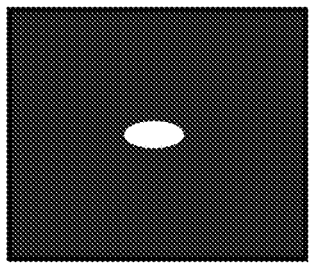
Figure 19:
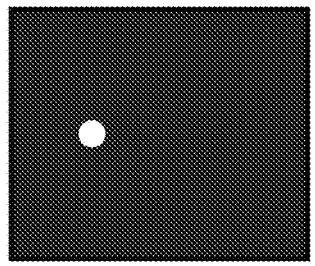
Figure 19:
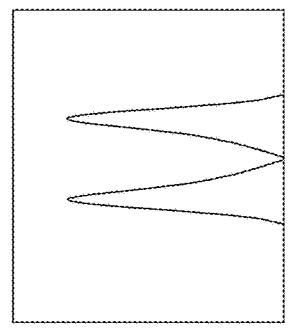
Figure 19:
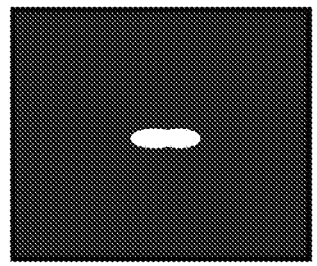

On the left-hand side of FIG. 19, two markings, i.e. markings A and B, are shown. They have the same shape, and are not located at the same position within the field of view of the system. Different inks have been used to print markings A and B, and they have a spectrum of a different shape. On the right-hand side of FIG. 19, the respective images on image sensor arrangement 60 after dispersion are shown. The images sensed by image sensor arrangement 60 differ in their shape. Thus, it is possible to discriminate between the two inks, and this can be used as an authentication factor.

Figure 20:
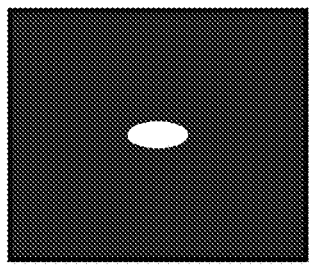
Figure 20:
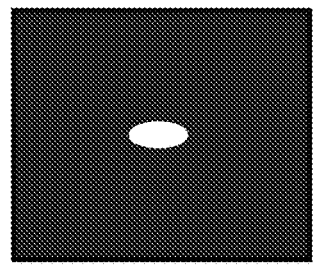
Figure 20:
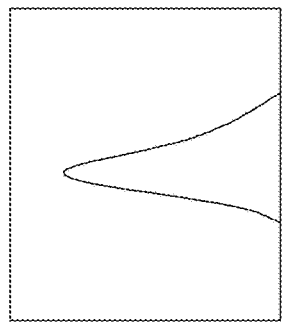
Figure 20:
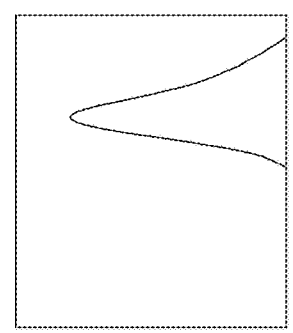
Figure 20:
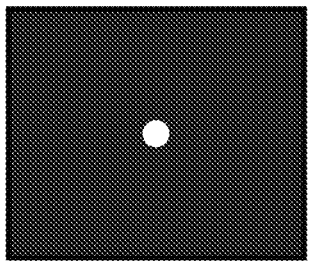
Figure 20:
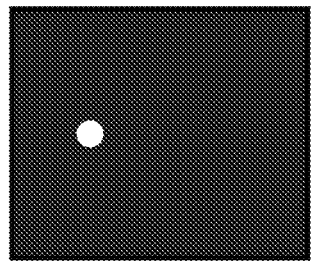

On the left-hand side of FIG. 20, two markings, i.e. markings A and B, are shown. They have the same shape, and are not located at the same position within the field of view of the system. Different inks have been used to print markings A and B, and they have a spectrum having the same shape but not at the same wavelength. On the right-hand side of FIG. 20, the respective images on image sensor arrangement 60 after dispersion are shown. Both images sensed by image sensor arrangement 60 give the same shape at the same position. Therefore, this cannot be used as an authentication factor.

Figure 21:
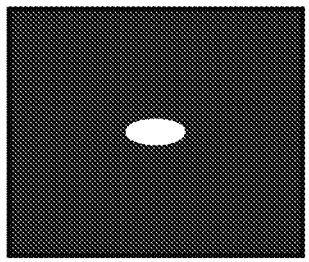
Figure 21:
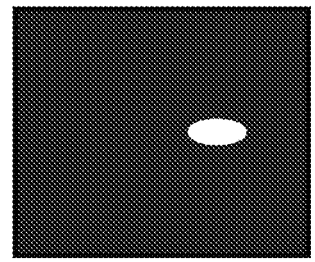
Figure 21:
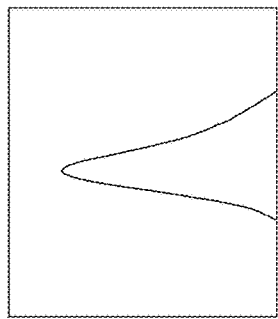
Figure 21:
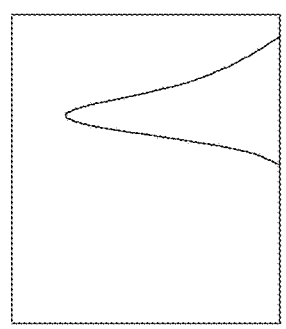
Figure 21:
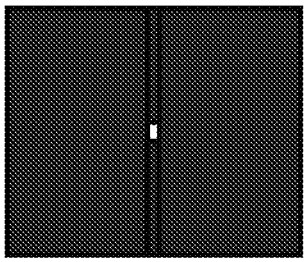
Figure 21:
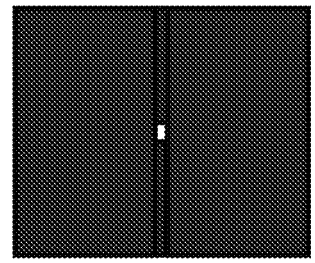

On the left-hand side of FIG. 21, two markings, i.e. markings A and B, are shown. They have the same shape that is defined by the mask, and the position within the field of view is defined by the mask. Different inks have been used to print markings A and B, and they have a spectrum having the same shape but not at the same wavelength. On the right-hand side of FIG. 21, the respective images on image sensor arrangement 60 after dispersion are shown. The images sensed by image sensor arrangement 60 have the same shape but at different position. Thus, it is possible to discriminate between the two inks based on the position within the image (because the only way to move the position is to use a different spectrum), and this can be used as an authentication factor.

In one embodiment, imaging system 200 does not use any slit between dispersive imaging arrangement 30 and object 10. Not using a slit is advantageous in that this enables acquisition of the dispersed image, without notably having to scan (by moving the imaging device or spectrometer) the surface of the object.

Now, before describing further embodiments of the invention, it may be useful to discuss some of the advantages brought about by some embodiments thereof, especially compared to prior art systems.

The above-described systems and methods in accordance with some embodiments of the invention are advantageous because they allow the construction of simple, compact, snapshot-based (non-scanning), low-cost and versatile devices, which may for example be incorporated in hand-held audit devices. Acquiring an image of the dispersed electromagnetic radiation indeed suffices, together with the reference spectral information which is known in advance and some information about the radiation before dispersion (i.e. information about mark 11 on object 10), to generate the measure of authenticity.

In contrast, imaging spectrometers used for scientific observations, as mentioned above, are typically complex, expensive or bulky. This is because these prior art systems usually aim at obtaining high-resolution spatial and spectral information about all regions of the object or scene.

Mechanical scanning of different bandpass filters in front of an imager allows reconstruction of a spectral irradiance map of the object $I(x, y, \lambda)$. However, the time to scan all filters and the complexity and fragility of the scanning mechanism makes the optical system cumbersome, not rugged and costly to implement.

Tuning systems based on Fabry-Perot interferometer or multistage liquid crystals avoid mechanical complexity but require high-quality and costly optical components (i.e. interferometric mirrors). The scanning of the filter parameters needed to acquire full set of images can be slow and can become another limitation for the use in handheld authentication systems.

Snapshot solutions relying on simultaneous imaging of an object through array of bandpass filters can achieve fast data acquisition and are especially adapted to handheld audit devices. Furthermore, such systems are compact and fit easily in a small volume of a hand-held device. The limited number of different passband filters is, however, a drawback, and it is also difficult to obtain suitable lenslet arrays. In addition, the spectral bands of the filter array have to be optimized to the ink spectral response, which prevents the use of off-the-shelf filter arrays while custom filter arrays are typically expensive to design and manufacture.

The example of a grating-based imager using computer tomography (i.e. CTIS) requires either a complex holographically recorded Kinoform type grating or several crossed gratings able to disperse the light in set of orders around the zero order. The need of several gratings complicates the setup and furthermore, the exposure time should be extended to compensate low efficiency in higher diffraction orders. The data acquisition is therefore slowed, rendering the setup unsuitable for a hand-held device. Such arrangements also require expensive large sensors with multi megapixels and extensive calculation for the tomography inversion.

The coded aperture imagers are as slow as the CTIS devices. Moreover, there is an intrinsic problem to reconstruct the full spectrum for specific design of the coded aperture. Meanwhile, integral field spectrometers require cumbersome image slicing optics and require relatively large surface image sensors.

Imaging Fourier transform spectrometers are complex instruments relying on expensive interferometers or birefringent prisms. In either case, the spectrometers require scanning of either an air gap or an angular orientation of the elements to obtain spectra that makes them slow and fragile.

The above-described prior art setups require complex optics and data treatment algorithms to calculate a full spectral data cube I(x, y, Δ), which is actually not required for authentication purposes. The inventors have found none of these prior art setups suitable for an economical, compact, robust, and fast auditing device based on a spectral imager.

Let us now describe further embodiments of the invention, which may help understand some aspects and advantages of the invention.

Figure 22A:
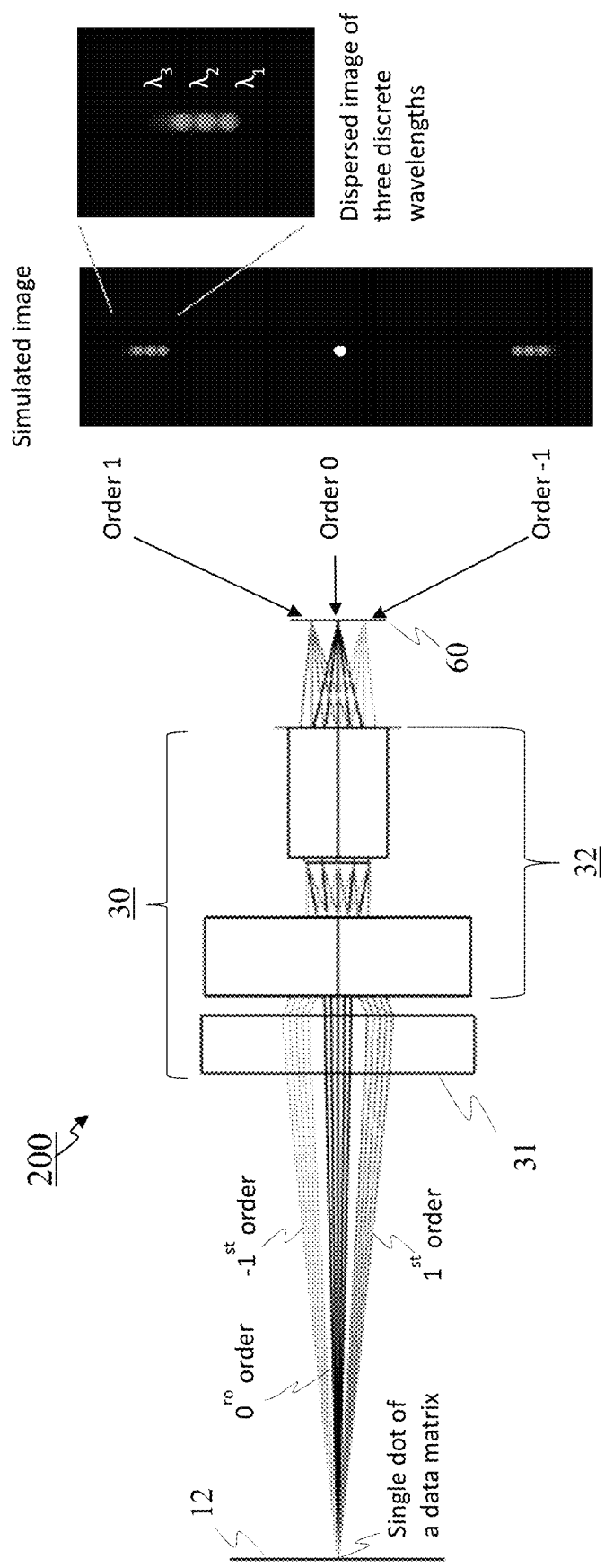
FIG. 22a schematically illustrates an imaging system in one embodiment of the invention, when applied, by simulation, to a single dot of a two-dimensional matrix barcode.
Figure 22B:
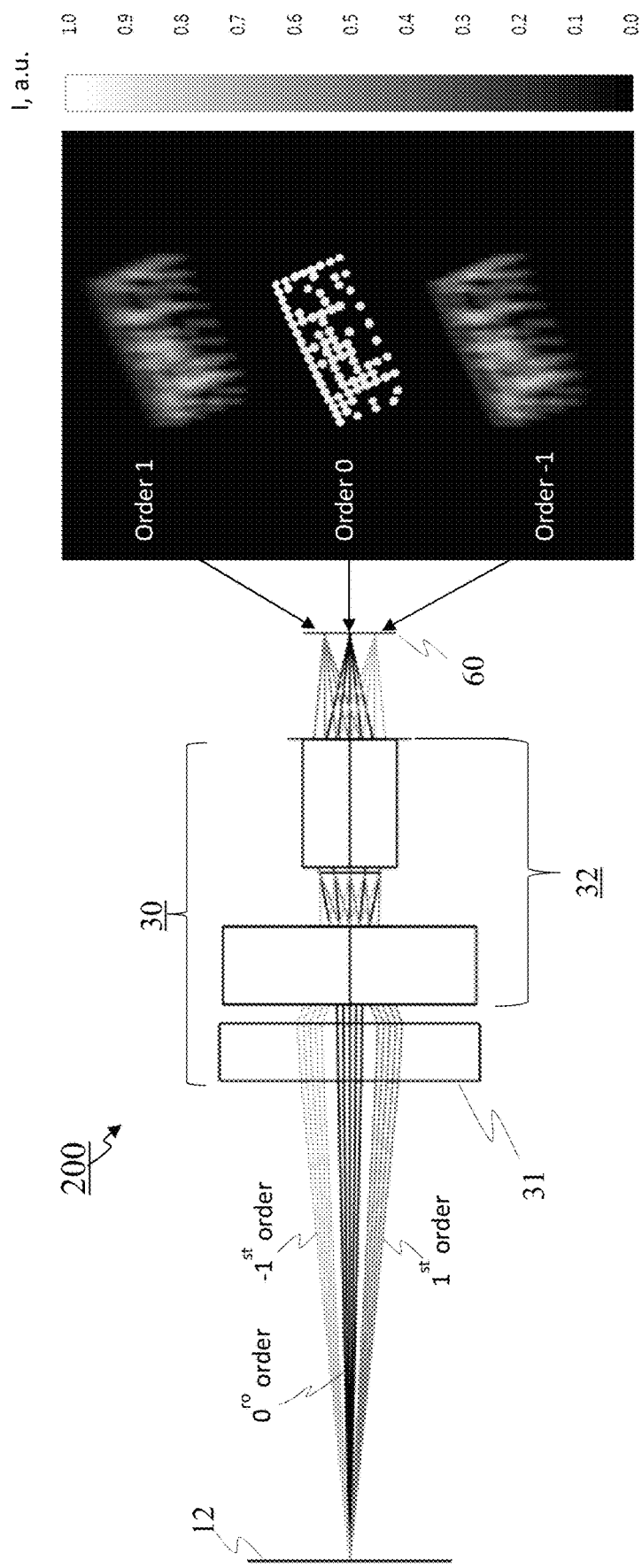
FIG. 22b schematically illustrates an imaging system in one embodiment of the invention, when applied, by simulation, to a two-dimensional matrix barcode.

In one embodiment, imaging system 200 has an optical setup with a transmission diffraction grating 31 mounted in front of a lens objective 32 in a dispersive imaging arrangement 30 which is then arranged in front of image sensor arrangement 60, as schematically illustrated on the left-hand side of both FIGS. 22a and 22b. System 200 uses a lens objective 32 or model EO57907 from Edmund Optics Ltd (based in York, UK) with f/2.5 and f=3.6 mm focal length. The dispersive element in arrangement 30 is a transmission diffraction grating 31 of type GT13-06V from Thorlabs, Inc., as mentioned above, with 600 lines-per-mm and 28.7° blaze angle. Area 12 of object 10 is within the field of view of imaging system 200.

FIG. 22a also shows, on the right-hand side of the drawing, the simulated dispersion of a single dot (of, for example, a two-dimensional matrix barcode) at three discrete wavelengths obtained by means of transmission diffraction grating 31 installed in front of imaging objective 32. The dispersion of the diffraction grating 31 obtained from a Zemax OpticStudio™ simulation is shown. One can see the direct ("Order 0") (not necessarily used in embodiments of the invention) and dispersed images in first positive ("Order 1") and first negative ("Order−1") orders of the single dot (with diameter of 0.5 mm) onto the image space for three discrete wavelengths.

More complex marks such as full two-dimensional matrix barcodes typically produce smeared images in the first order of the grating 31 due to the specific, broader emission spectra of the inks, and an associated overlap of the successive spread dots in the direction of diffraction is observed, as illustrated on the right-hand side of FIG. 22b. In particular, FIG. 22b shows the simulated dispersion of a data matrix with the non-dispersed image ("Order 0") (not necessarily used in embodiments of the invention) and two images associated with both dispersed orders, i.e. the first positive order ("Order 1") and the first negative order ("Order−1"). The direct image in the zero order of the grating is not influenced by the grating (except for intensity attenuation) and can be used to decode a printed two-dimensional matrix barcode. The scale shown on FIG. 22b is in intensity in arbitrary units ("I, a.u.").

Figure 23:
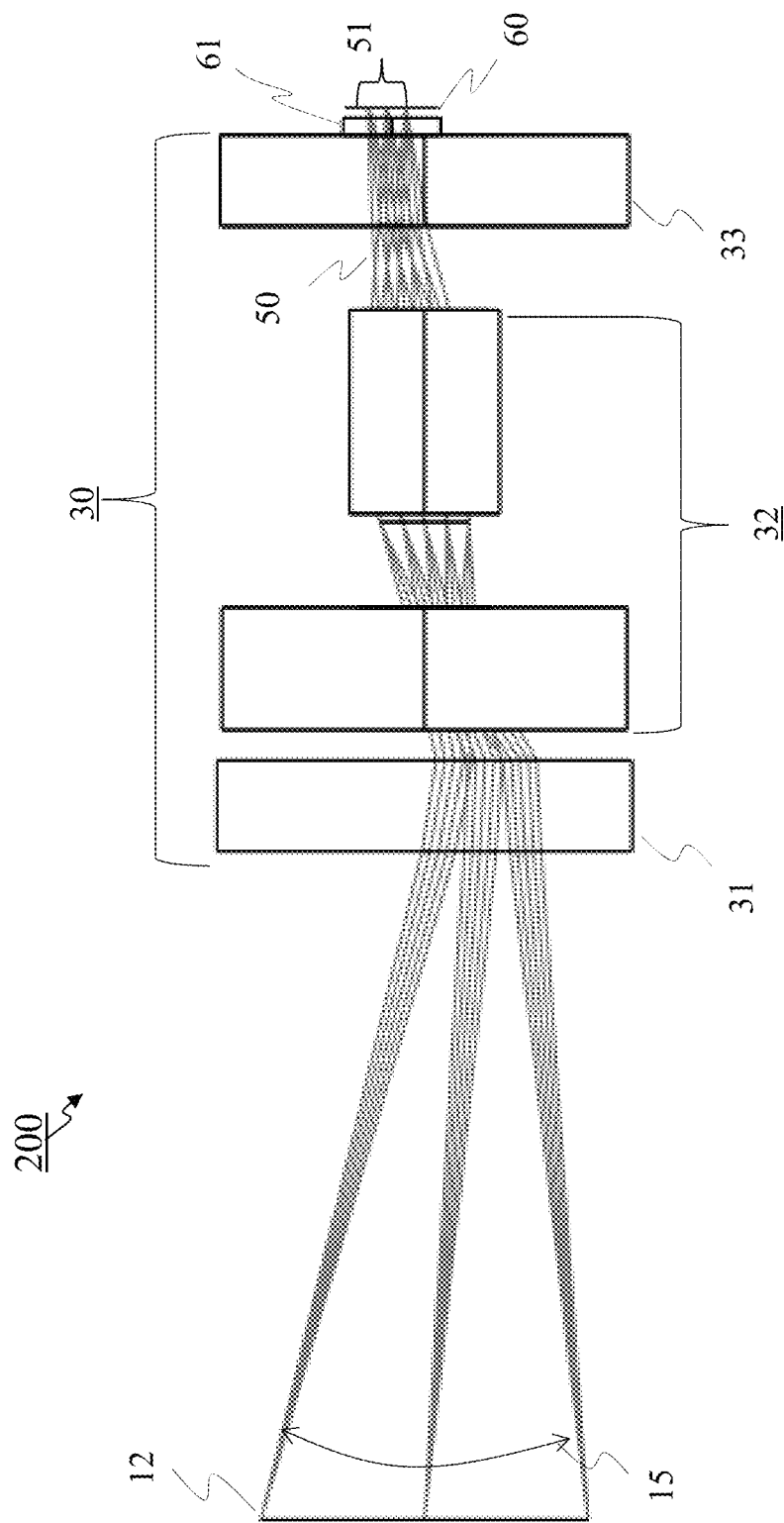
FIGS. 23 and 24 schematically illustrate two imaging systems in two embodiments of the invention, respectively.
Figure 24:
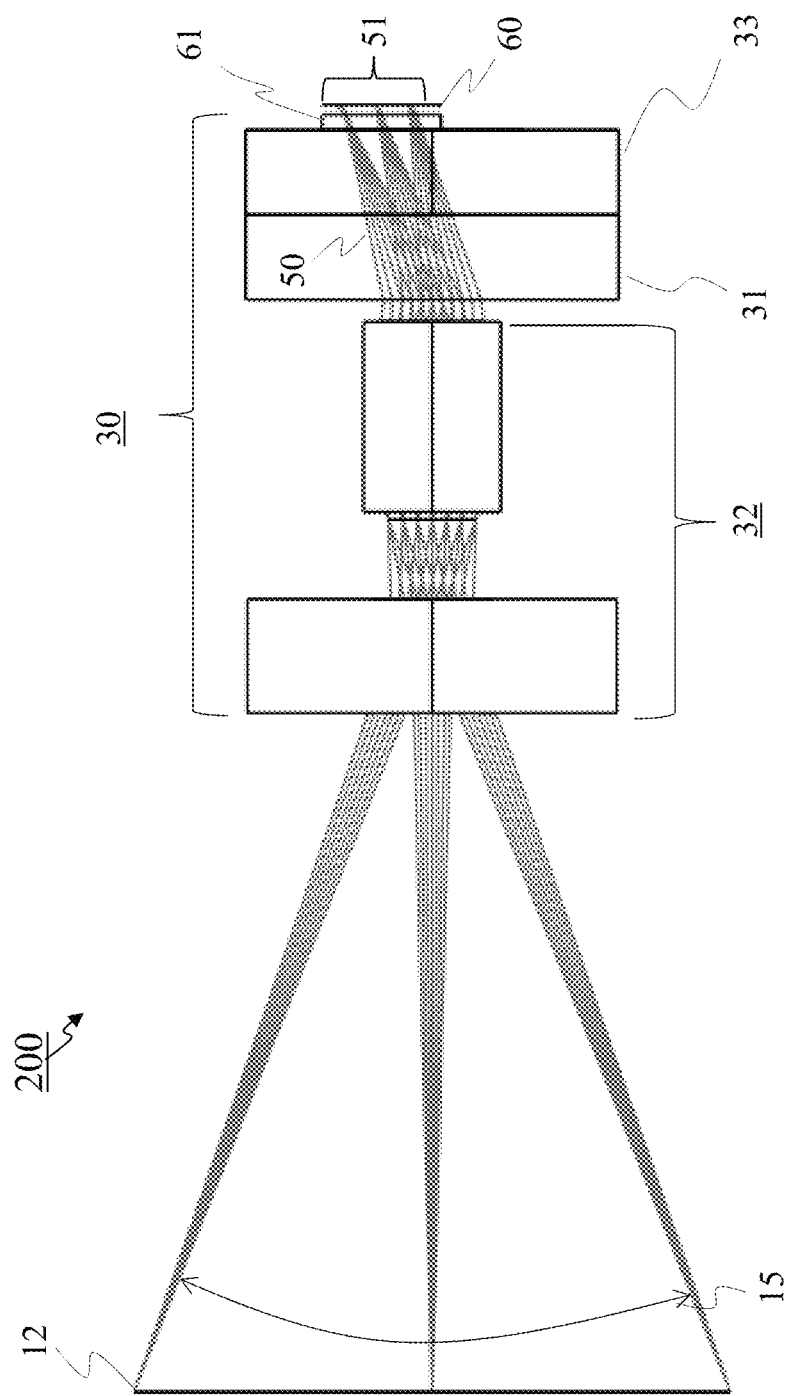

FIGS. 23 and 24 schematically illustrate three imaging systems 200 in three embodiments of the invention, respectively, showing possible components of dispersive imaging arrangement 30, such as a transmission grating 31, an imaging lens 32, and an optical long-pass filter 33. Area 12 of item 10 can be imaged by arrangement 30, considering its field of view (FOV) 15. Dispersed image 51 of area 12 corresponding to shortest wavelength is indicated. Reference 61 is the window 61 of the image sensor(s) 63.

Arrangement 30 of FIG. 23 comprises an imaging lens 32, a transmission grating 31 (600 l/mm) mounted in front of lens 32 (lens objective Edmund Optics 57907), and an optical long-pass filter 33 mounted behind lens 32. As already explained with reference to FIG. 4, this enables to produce low optical aberrations by using the broad field-of-view of the lens objective.

Grating 31, which is mounted in front of imaging lens 32, deflects the beams for the first-order and imaging lens 32 receives the input beams. In such a configuration, a wide-FOV imaging lens 32 is used which allows incident beams at angles specific for the first order.

In arrangement 30 of FIG. 24, both transmission grating 31 (360 l/mm) and optical long-pass filter 33 are mounted behind lens 32 (lens objective Edmund Optics 57907). As already explained with reference to FIG. 5, this enables to cancel the dependence on the object position along the optical axis.

Figure 26:
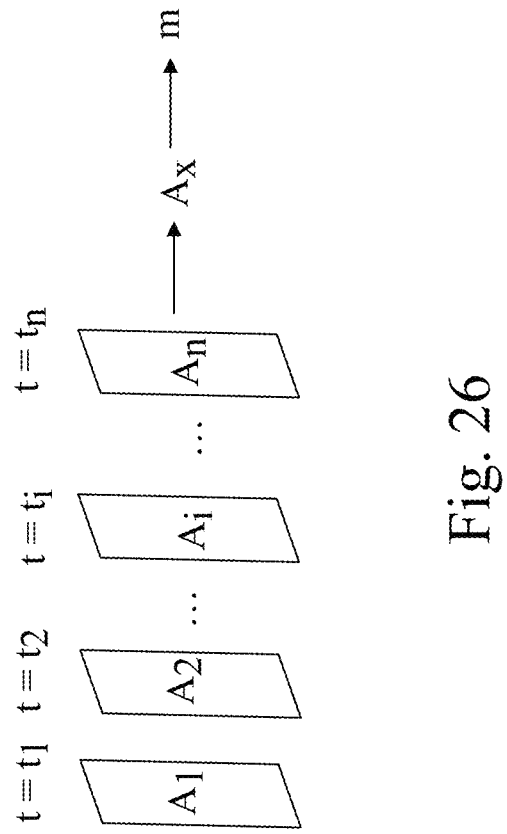
FIGS. 25 and 26 schematically illustrate the generation of a measure of authenticity of an object, in two embodiments of the invention, wherein the image sensor arrangement images the dispersed electromagnetic radiation in a plurality of illumination periods.
Figure 25:
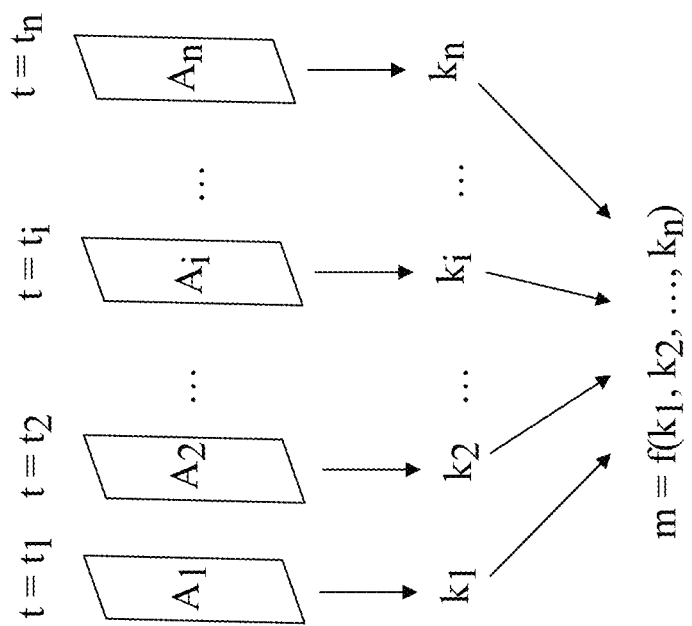
Figure 27:
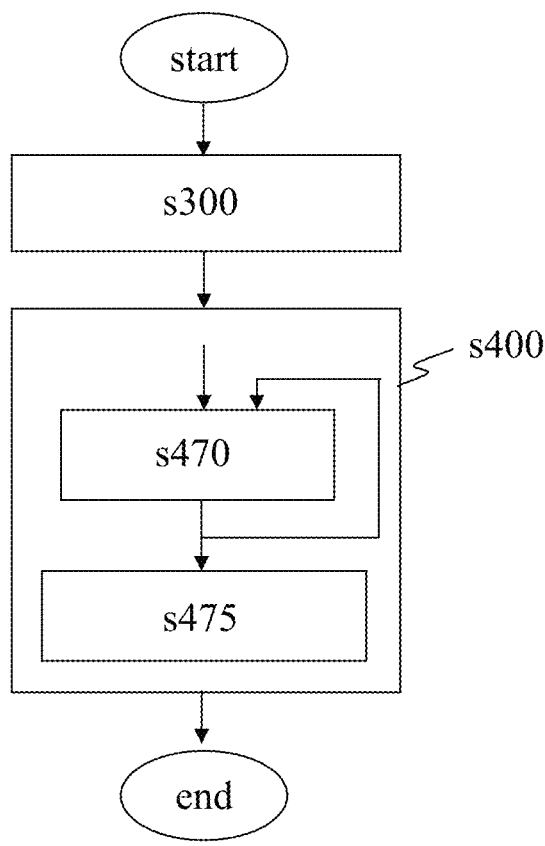
FIGS. 27 and 28 are flowcharts of imaging methods in two embodiments of the invention, wherein the generation of the measure of authenticity of an object follows the image sensor arrangement imaging the dispersed electromagnetic radiation in a plurality of illumination periods.
Figure 28:
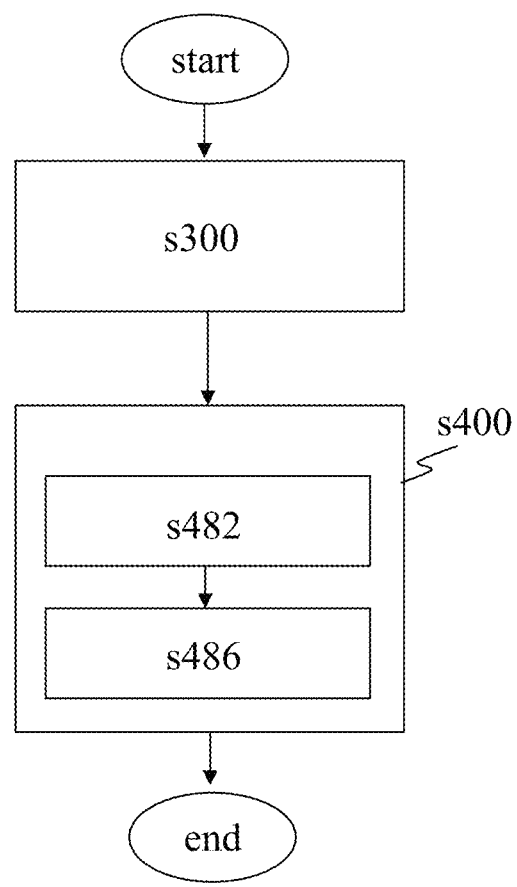

Let us now describe further embodiments of the invention involving imaging over a plurality of illumination periods, first with reference to FIGS. 25 and 27 and then with reference to FIGS. 26 and 28. These further embodiments may naturally be combined with any of the above-described embodiments.

FIG. 25 schematically illustrates the generation of a measure of authenticity of object 10 in one embodiment of imaging system 200. In this embodiment, as a first step, image sensor arrangement 60 images the above-described dispersed electromagnetic radiation 50 in a plurality of illumination periods $t_1, t_2, \ldots, t_n$. In one embodiment, n equals 2. In another embodiment, n equals 3. Object 10 is illuminated differently during each illumination period. Each illumination period encompasses one imaging period, as schematically illustrated with reference to FIG. 39.

Then, the measure of authenticity is generated. The generation of the measure of authenticity comprises the following steps.

First, for each illumination period $t_i$ ($1 \leq i \leq n$), an intermediate measure of authenticity $k_i$ is generated depending at least on a relation between dispersed electromagnetic radiation 50 ($A_i$) imaged at the illumination period $t_i$ and a part of the reference spectral information, said part of the reference spectral information being associated with how object 10 has been illuminated during illumination period $t_i$. In one embodiment, intermediate measure of authenticity $k_i$ comprises, for each illumination period $t_i$, deconvolving the dispersed electromagnetic radiation imaged at illumination period $t_i$ by said part of the reference spectral information associated with how object 10 has been illuminated during illumination period $t_i$.

Secondly, the measure of authenticity m is generated based on the plurality of intermediate measures of authenticity $k_1, k_2, \ldots, k_n$. This is illustrated on FIG. 25 by the exemplary equation: $m = f(k_1, k_2, \ldots, k_n)$, wherein f is a function such as for example the arithmetic mean of the intermediate measures of authenticity.

FIG. 27 is a flowchart of an imaging method corresponding to the process illustrated by FIG. 25, wherein the generation s400 of the measure of authenticity of object 10 follows image sensor arrangement 60 imaging s300 dispersed electromagnetic radiation 50 in a plurality of illumination periods $t_1, t_2, \ldots, t_n$. The generation s400 of the measure of authenticity comprises generating s470, for each illumination period $t_i$, an intermediate measure of authenticity $k_i$ as described above, and then generating s475 the measure of authenticity m based on the plurality of generated intermediate measures of authenticity $k_1, k_2, \ldots, k_n$.

In one embodiment, generating s470, for each illumination period $t_i$, the intermediate measure of authenticity $k_i$ comprises: deconvolving, for each illumination period $t_i$, the dispersed electromagnetic radiation imaged at illumination period $t_i$ by said part of the reference spectral information associated with how object 10 has been illuminated during illumination period $t_i$.

In one embodiment (not illustrated in FIG. 27), the intermediate measure $k_i$ of authenticity of each illumination period is generated s470 without waiting for the completion of imaging step s300 for all illumination periods. That is, step s470 can be carried out while step s300 is still under way. For example, as soon as image sensor arrangement 60 has imaged dispersed electromagnetic radiation 50 for illumination period $t_1$, intermediate measure of authenticity $k_1$ may be generated s470 for illumination period $t_1$ and then stored, so that generating step s475 may later be carried out based on all stored intermediate measures of authenticity $k_1, \ldots, k_n$.

FIG. 26 schematically illustrates the generation of a measure of authenticity of object 10, in another embodiment of the invention. In this embodiment, as in the embodiment described with reference to FIGS. 25 and 27, image sensor arrangement 60 first images dispersed electromagnetic radiation 50 in a plurality of illumination periods $t_1$, $t_2, \ldots, t_n$. The value n may for example be equal to 2 or 3, and object 10 is illuminated differently during each illumination period. Again, each illumination period encompasses one imaging period, as schematically illustrated with reference to FIG. 40. The measure of authenticity is then generated through the following steps:

The imaged dispersed electromagnetic radiation $\{A_1, A_2, \ldots, A_n\}$ is processed based at least on the dispersed electromagnetic radiation $A_1$ imaged at a first illumination period $t_1$ among the plurality of illumination periods $t_1$, $t_2, \ldots, t_n$ and the dispersed electromagnetic radiation $A_2$ imaged at a second illumination period $t_2$, to produce the processed imaged dispersed part $A_x$. All images $A_1$, $A_2, \ldots, A_n$ may also be taken into account to produce the so-called processed imaged dispersed electromagnetic radiation composite image $A_x$. That is, the processed imaged dispersed electromagnetic radiation composite image $A_x$ may be generated based on the dispersed electromagnetic radiation images imaged at a first to nth illumination periods $t_1, t_2, \ldots, t_n$.

Then, the measure of authenticity m is generated depending at least on a relation between the processed imaged dispersed electromagnetic radiation composite image $A_x$ and reference spectral information. In one embodiment, the generation of the measure of authenticity m comprises deconvolving the processed imaged dispersed electromagnetic radiation composite image $A_x$ by reference spectral information.

FIG. 28 is a flowchart of an imaging method in one embodiment corresponding to the process illustrated by FIG. 26, wherein the generation s400 of the measure of authenticity follows image sensor arrangement 60 imaging s300 dispersed electromagnetic radiation 50 in a plurality of illumination periods $t_1$, $t_2$, $t_n$.

Namely, after imaging s300, by image sensor arrangement 60, dispersed electromagnetic radiation 50 in a plurality of illumination periods $t_1$, $t_2, \ldots, t_n$, the measure of authenticity is generated s400. Step s400 comprises, first, generating s482 the so-called processed imaged dispersed electromagnetic radiation composite image $A_x$ based at least on the dispersed electromagnetic radiation $A_1$, $A_2$ imaged at a first and second illumination period $t_1$, $t_2$, and preferably based on all dispersed electromagnetic radiation images $A_1$, $A_2, \ldots, A_n$ imaged at illumination periods $t_1, t_2, \ldots, t_n$. Then, the measure of authenticity m is generated s486 depending at least on a relation between processed imaged dispersed electromagnetic radiation composite image $A_x$ and reference spectral information.

In one embodiment, step s482 may be implemented as follows: First, a weighting factor is calculated based on a statistical processing of pixel values of the first image data $A_1$ (i.e., the dispersed electromagnetic radiation imaged at illumination period $t_1$) and pixel values of the second image data $A_2$ (i.e., the dispersed electromagnetic radiation imaged at illumination period $t_2$). Then, third image data $A_x$ (i.e., the so-called processed imaged dispersed electromagnetic radiation composite image) is generated by calculating a weighted combination using the pixel values of said first image data $A_1$, the pixel values of said second image data $A_2$, and said weighting factor. Such an implementation may be performed to maximize the image contrast between a dispersed image of marking (e.g. a barcode) and the dispersed image of remaining background, as described in PCT application WO 2014/187474 A1 by the same applicant. WO 2014/187474 A1 discloses techniques to enhance the image of a mark or code printed over fluorescing background or other backgrounds. Several images of a mark or code are acquired under different illumination conditions, and an image subtraction algorithm suppresses the background to facilitate the extraction of the printed codes from the images.

This embodiment, which will be described in more detail with reference to FIGS. 29a to 31, can be regarded as a method to enhance the spectral recognition and authentication of a mark (such as for example a printed mark) on backgrounds (such as for example complex fluorescing backgrounds), by using an imager with a dispersive imaging arrangement 30 (such as for example a transmission diffraction grating) and background subtraction using differential images (as described in WO 2014/187474 A1). The background subtraction using differential images, as described in WO 2014/187474 A1, will be hereinafter referred to as the differential illumination background subtraction (DIBS) feature, technique, or algorithm.

This embodiment addresses in particular the following potential problems: The dispersed electromagnetic radiation imaged by means of dispersive imaging arrangement 30, as discussed above, may overlap with the zero-image and, for example, the fluorescing background of a can cap (or the like) could pose problems for the authentication process. One embodiment of the invention to reduce the effect of overlap is to use optionally an appropriate mask which hides part of the image of object 10 to avoid the overlap between the zero- and first-order images of the code created by means of arrangement 30 (in embodiments in which both the zero- and first-order of the code are imaged). Such a mask however is physical and may complicate the opto-mechanical design of imaging system 200.

The DIBS-based embodiment aims at addressing such problems. It uses images obtained through arrangement 30 which have an overlap between the orders, and a background subtraction using the DIBS technique is applied. The DIBS technique reduces the effect of fluorescing background (or the like) on the zero-order images (in embodiments in which both the zero- and first-order of the code are imaged) and corrects the first-order images (dispersed electromagnetic radiation 50), thus improving the spectrum-based generation of the measure of authenticity. This is particularly advantageous when the fluorescing background has an excitation spectrum which differs from the ink to be authenticated (e.g. matrix code).

Figure 29A:
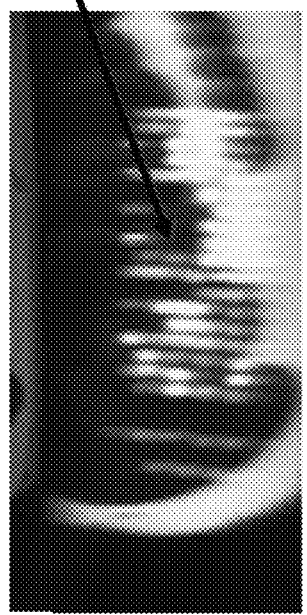
FIGS. 29a and 29b show images of a soft-drink can cap without (FIG. 29a) and with a mask (FIG. 29b) acquired using an imaging system in one embodiment of the invention.

An example of images of a sample object 10 with fluorescing background obtained with an imaging system 200 of FIG. 1 is shown in FIG. 29a (an image of soft-drink can cap without using a mask). A region with overlapping zero- and first-order images of sample object 10 can be observed in FIG. 29a. This region may be unusable for spectrum-based authentication purposes.

Therefore, the image of FIG. 29a has two problems: 1) the background visible in the zero-order overlaps the first order image, and 2) the background emits light which is diffracted in the $1^{st}$ order and may interfere "spectrally" with the spectral information to be authenticated. The first problem may be addressed by using a physical mask. The DIBS technique specifically addresses the second problem, by significantly reducing the background signal from the image.

Figure 29B:
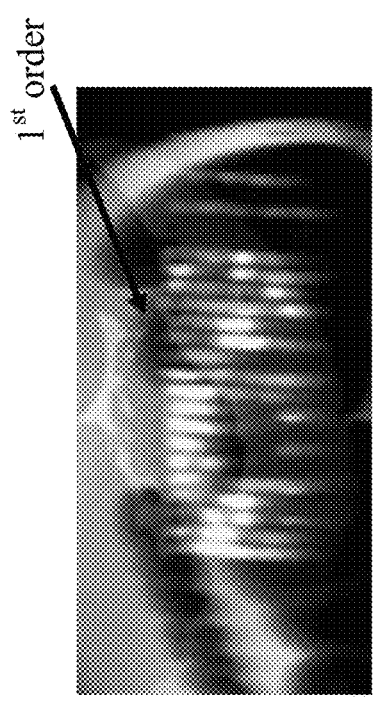

FIG. 29b shows an image of the same sample object 10 taken with a physical mask in one embodiment of the invention. No overlap between the orders is present which renders an efficient spectrum-based authentication possible, but the useful field-of-view may be limited. Such a limitation may, under certain circumstances, restrict the user to operate the device only with specific orientations possibly leading to an increase of authentication time for a sample object 10.

In accordance with the above-mentioned DIBS-based embodiment, no mask is used, but images are acquired in a plurality of illumination periods $t_1, t_2, \ldots, t_n$ with several different illuminations and then an image subtraction is carried out in accordance with the DIBS technique. This reduces the influence of a fluorescing background (or the like) on both the decoding (if used) and spectrum extraction.

For example, the DIBS algorithm may use two first order images acquired by illuminating object 10 with blue and green light respectively. As an output of the algorithm, an image is obtained which is the difference or linear combination of images taken with blue and green illumination. This image typically has better contrast when it comes to the printed code compared to the initial images, thus improving the performance of the decoding engine (if used). The resulting image improves the authentication process using the first-order image (i.e., dispersed electromagnetic radiation 50) created by means of dispersive imaging arrangement 30. This effect may be explained by the different excitation spectra for both the ink used to print the code and the fluorescing background of object 10 (e.g. a soft-drink can cap). The ink is better excited in blue than in green while the background of the soft-drink can cap has mostly the same excitation for both colours. Subtracting the images then leads to increase of the code contrast and improved authentication capability.

Figure 30:
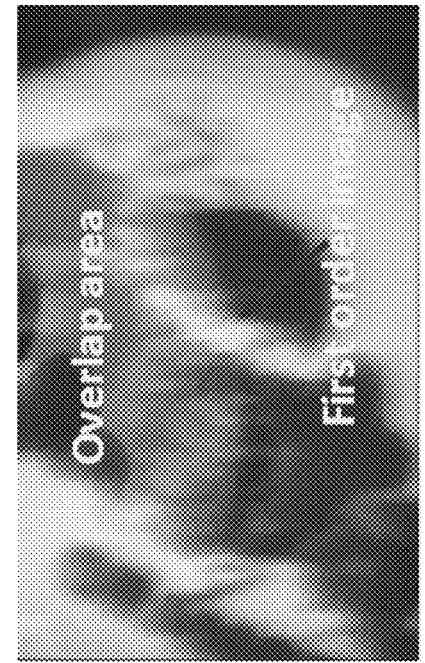
FIG. 30 shows examples of images of a soft-drink can cap acquired without a physical mask but excited in two different illumination periods by blue light (left-hand image) and green light (right-hand image), in one embodiment of the invention.
Figure 30:
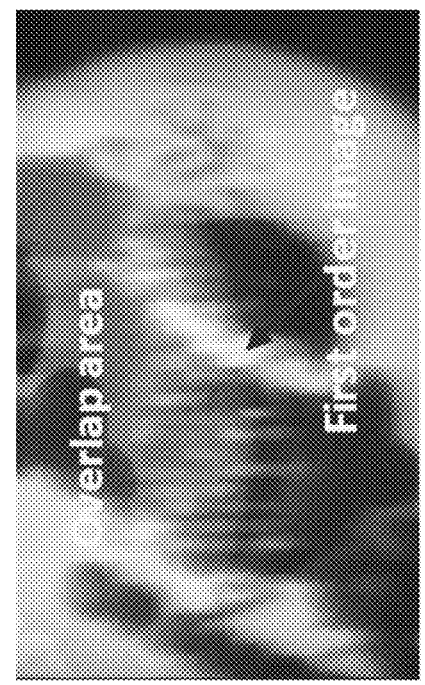

FIG. 30 shows examples of images of a soft-drink can cap acquired without a physical mask but excited in two different illumination periods by blue light (right-hand image) and green light (left-hand image), in one embodiment of the invention.

Figure 31:
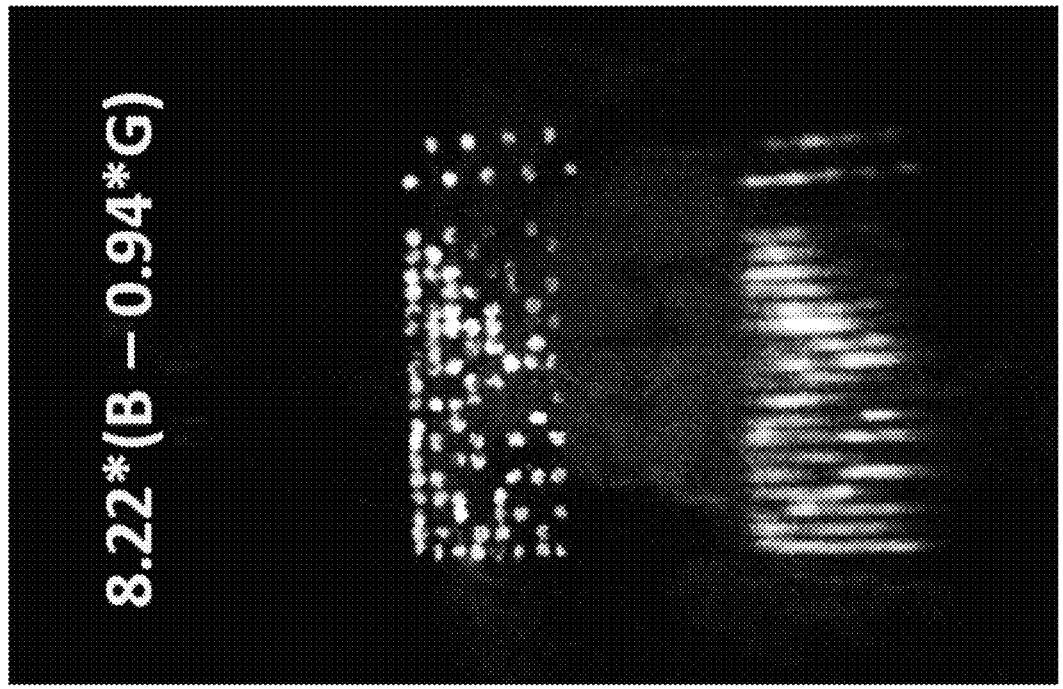
FIG. 31 shows examples of background-subtracted images using two different linear combinations, in one embodiment of the invention.
Figure 31:
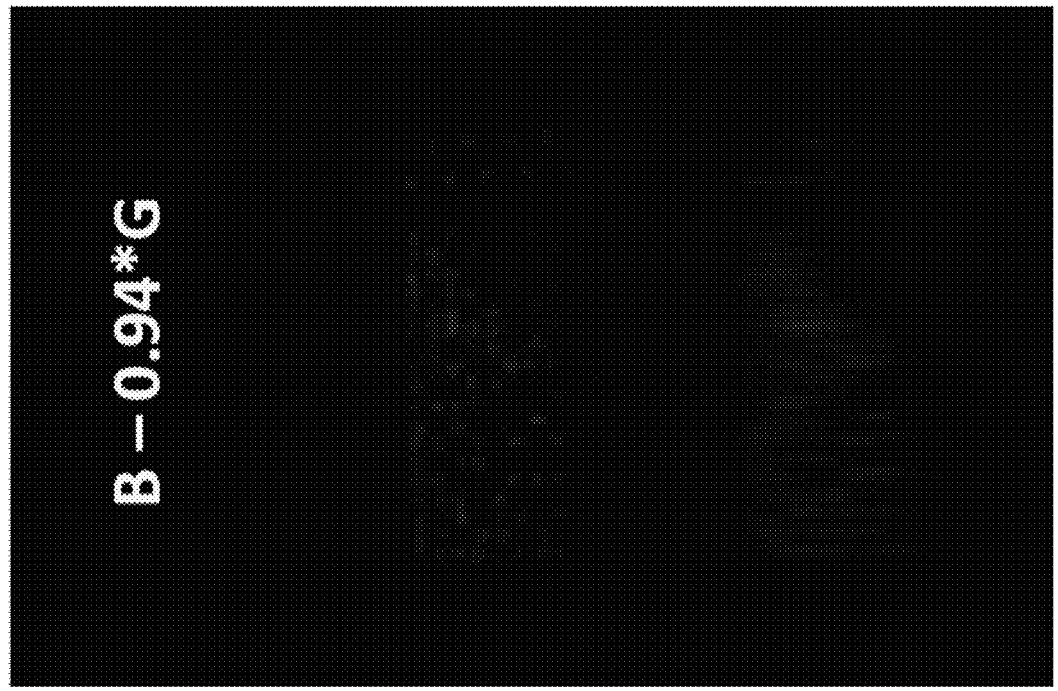

FIG. 31 shows examples of background subtracted images using DIBS algorithm, using respectively the linear combinations B−0.94*G (right-hand image) and 8.22*(B−0.94*G) (left-hand image), in one embodiment of the invention. In the linear combination B−0.94*G, B is a first image excited in a first illumination period by blue light, G is a second image excited in a second illumination period by green light, and 0.94 is the weighting factor. In the linear combination 8.22*(B−0.94*G), the significance of B, G and 0.94 are the same as for the first linear combination, and 8.22 is a scaling factor. Regarding these linear combinations, the weighting factor and the scaling factor, see equation (1) in WO 2014/187474 A1, page 8, and the corresponding description.

Thanks to the DIBS algorithm, the treated image is more suitable for decoding (in embodiments in which both the zero- and first-order of the code are imaged) and improves the spectrum-based generation of the measure of authenticity.

Let us now describe further embodiments of the invention applicable to both the imaging over a single illumination period and the imaging over a plurality of illumination periods. These further embodiments may be combined with any of the above-described embodiments.

In one embodiment, object 10 bears a visible or invisible mark 11 (or sign) printed with a printing ink. Such ink contains coloring and/or luminescing agents, such as dye(s) and/or pigment(s) that are typically hard to produce and to reverse-engineer. These optical agents may be classified into two main classes: 1) optical agents producing specific reflective properties upon controlled illumination, and 2) optical agents producing luminescence upon controlled illumination.

The expected spectral response of said optical agents, when subject to particular illumination conditions, is known a priori and constitutes the reference spectral information.

Figure 32:
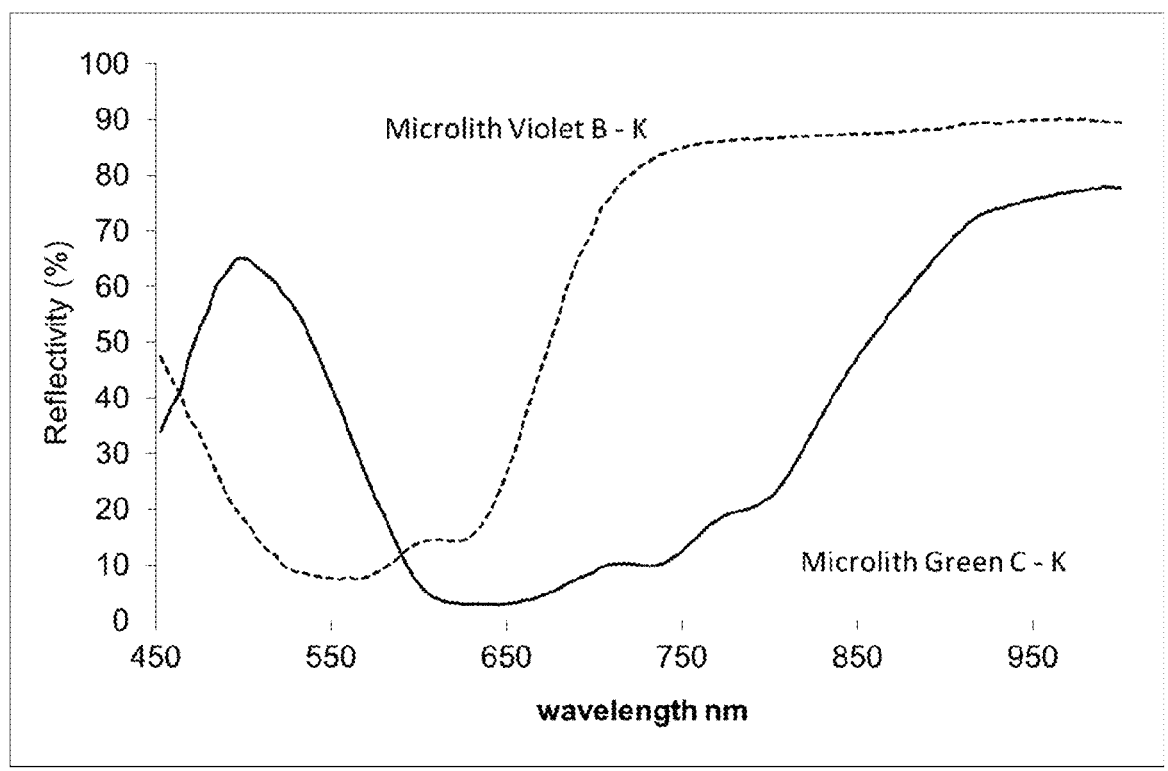
FIG. 32 shows the spectral reflectivity of two different colour pigments.

In the case of reflective properties, the spectral response is called the spectral reflectivity, which is the fraction of electromagnetic power reflected per unit of wavelength. For example, FIG. 32 shows the spectral reflectivity of two different color pigments (Microlith® from BASF AG, based in Ludwigshafen, Germany), as measured with a spectrophotometer in reflectance mode (e.g. model DU-640 Spectrophotometer from Beckman Coulter Inc., based in Brea, Calif., U.S.).

In order for the reflectivity to be determined, a known broadband illumination source may be used, since the wavelength-dependent reflected electromagnetic radiation 20 (spectral radiance, which is measured) depends on the incident spectral composition of the illumination (spectral irradiance). The spectral reflectivity may be determined either using a calibrated illumination source (in wavelength) or by comparison with a surface of known spectral reflectivity (such as a reference white surface like Spectralon® from LabSphere, based in North Sutton, N.H., U.S.) using a non-calibrated broadband light source. The term "broadband" means that the light source emits at least at all wavelengths in the range of interest. Examples of broadband light source spectral distribution are shown for a white LED (e.g., an OSRAM OSLON SSL white LED) in FIG. 33 and tungsten filament lamp (incandescent bulb) in FIG. 34 (Source: Schroeder, D. V., 2003. "Radiant Energy," online chapter for the course, 'Energy, Entropy, and Everything,' Physics Department, Weber State University [accessed May 2016] http://physics.weber.edu/schroeder/eee/chapter6.pdf.).

Figure 33:
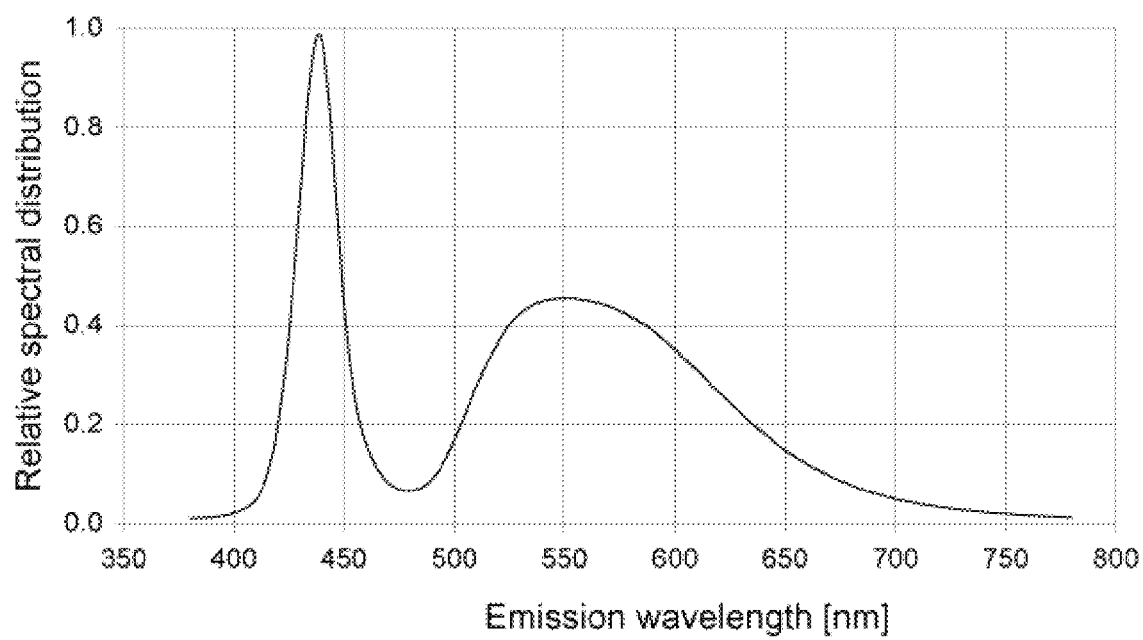
FIG. 33 shows the typical relative spectral distribution of a white LED.
Figure 34:
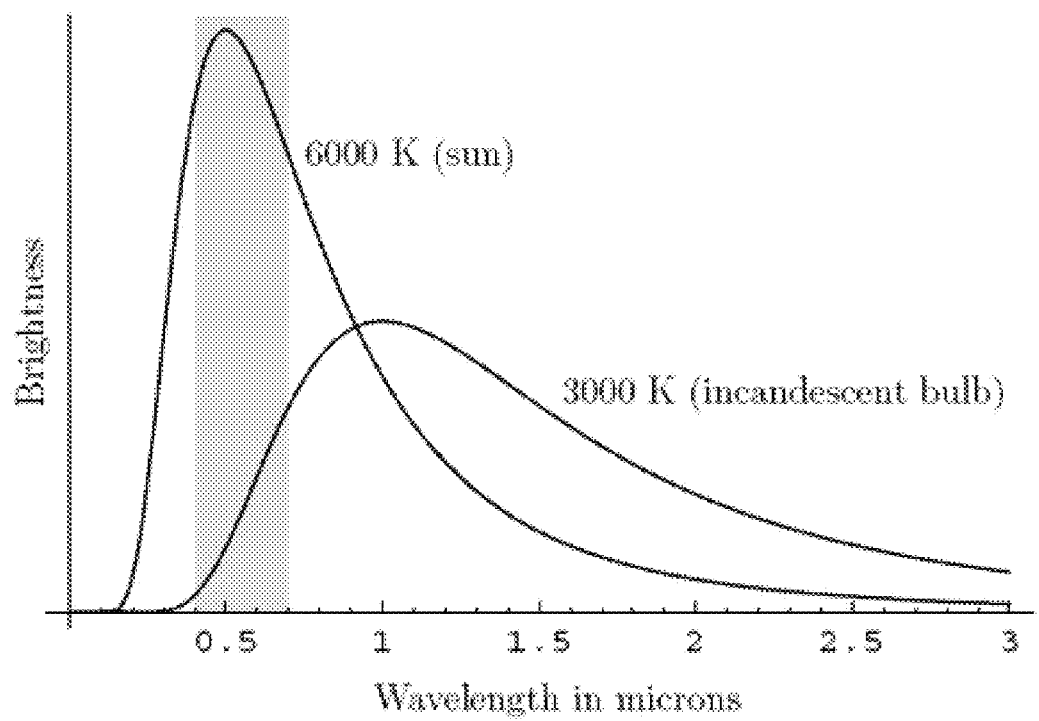
FIG. 34 shows the typical relative spectral distribution of an incandescence bulb at 3000 K temperature, compared to the one of the sun.

It can be observed from FIGS. 33 and 34 that the spectrum reflected from a given mark strongly depends on the spectrum of the irradiation source. Therefore, the so-called "reference spectral information" should be the spectral reflectivity (reflectance) of the object or mark. In embodiments where the reference spectral information is the recorded spectral irradiance, said reference spectral information is then intrinsically related to the spectral distribution of the irradiation source, which should preferably be controlled when the reference spectral information is recorded the first time (enrolled) and also when it is measured to determine the authenticity of object 10.

A second class of optical agents covers luminescent dyes or pigments and has different requirements in terms of illumination and measurement.

Figure 35:
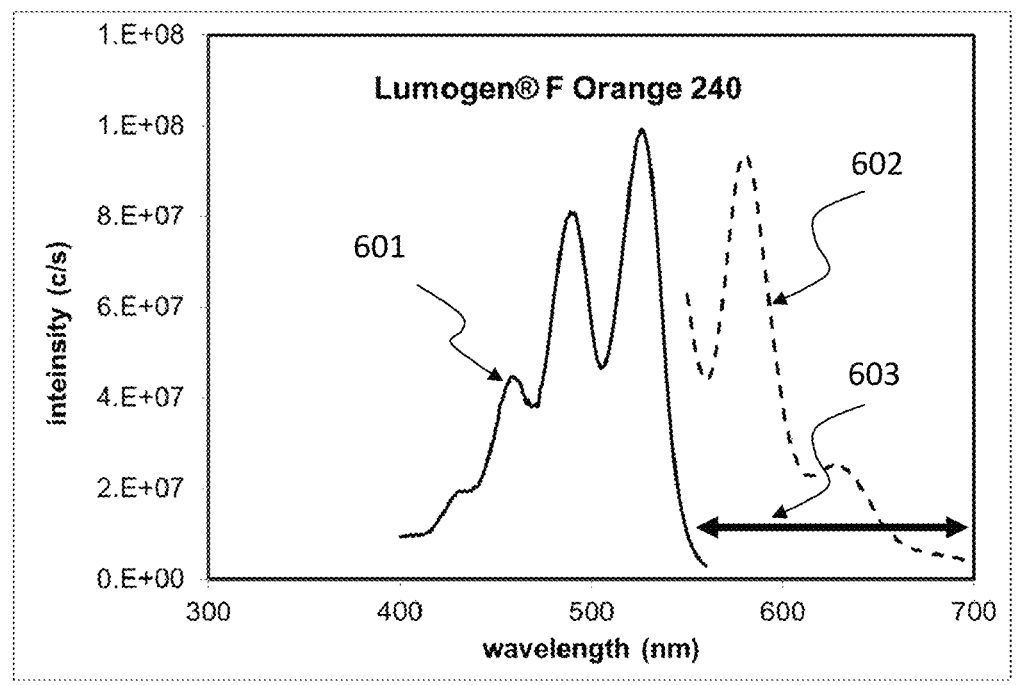
FIG. 35 shows the excitation spectrum and emission spectrum of an exemplary fluorescent dye.

Fluorescent dyes and pigments may be selected for example from perylenes (e.g. Lumogen F Yellow 083, Lumogen F Orange 240, Lumogen F Red 300, all available from BASF AG). FIG. 35 (source: WO 2016/042025 A1) shows an example of excitation and emission spectrum of such a fluorescent dye. In particular, it shows the excitation spectrum 601 and emission spectrum 602 of a fluorescent dye (Lumogen® F Orange 240 from BASF AG) added in an ink used for printing for example a digital code. Double-headed arrow 603 indicates the wavelength range where the emission spectrum can be used as reference spectral information. It can be observed from FIG. 35 that the excitation spectrum spans between about 400 and 550 nm and the emission spectrum from about 550 to 700 nm. This requires that the illumination source emits at least in the region of excitation for the fluorescent dye to be excited, but preferably not in the emission spectral region to avoid interfering with the fluorescence emission to be detected, which is typically several orders of magnitude weaker than the direct reflection.

This illumination and detection scheme is known in the field of measuring fluorescence and usually comprises a narrow band illumination source such as for example a single color LED (a blue one at 450 nm or a green one at 530 nm may be adapted to excite the Lumogen of FIG. 35) and a long pass optical filter in the detection optical path to cut out any reflection for the tail of the illumination source in the region of emission. Optionally, a short pass optical filter may also be arranged between the LED and the object 10 to be authenticated.

Figure 36:
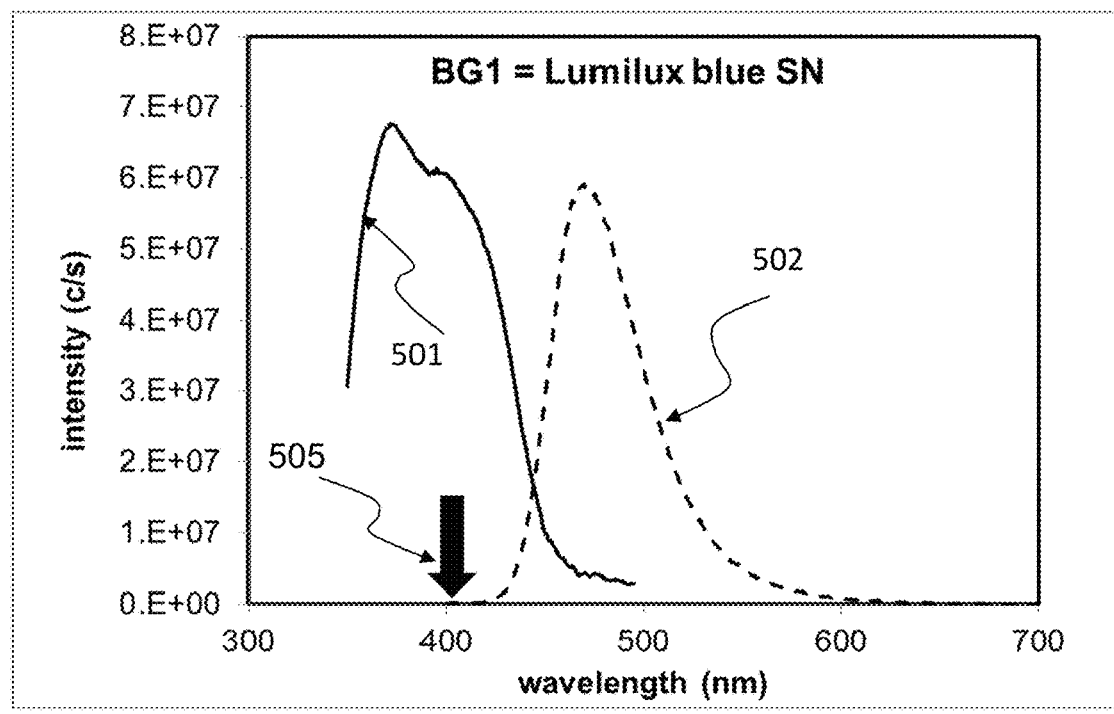
FIGS. 36 and 37 show the emission and excitation spectra for exemplary phosphorescent phosphor pigments.
Figure 37:
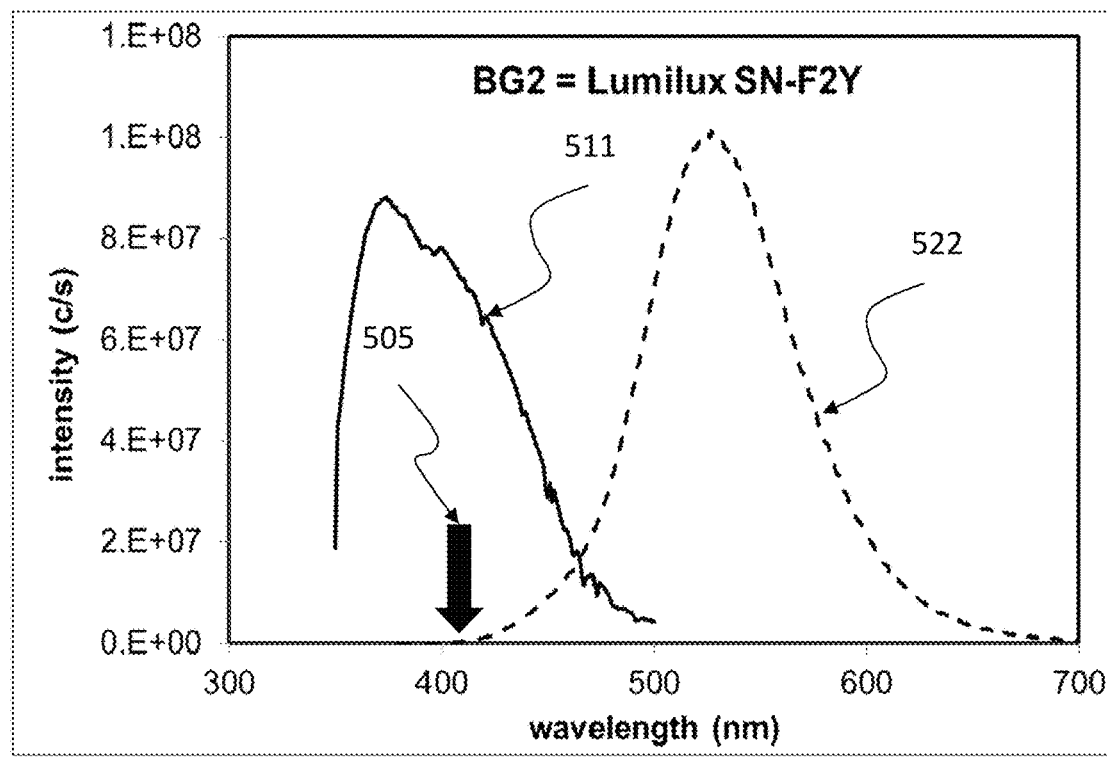

FIGS. 35 and 36 show emission and excitation spectra for two exemplary phosphorescent phosphor pigments: Lumilux® blue SN and Lumilux® green SN-F2Y from Honeywell International, Inc., based in Morris Plains, N.J., U.S. The spectroscopic properties shown in FIGS. 35 and 36 were measured on samples printed with silk-screen inks using a spectrofluorometer (Horiba Jobin Yvon Fluorolog model FLIII-22, from Horiba, based in Kyoto, Japan). The approach is the same as for the above-described fluorescent dyes or pigments. Excitation spectra 501 and 511 and emission spectra 502 and 522 of two phosphorescent pigments are used for printing marks to be authenticated in the form of patch, logo or designs. Black arrow 505 on each of FIGS. 35 and 36 indicates the wavelength peak of a deep blue LED at 410 nm which may be used for exciting the phosphorescent pigments efficiently.

In one embodiment, the reference spectral information is generated prior to operating the system and method of authentication. This may be done through a recording and registering of the extracted spectral information, in the same or very similar conditions of illumination and detection (for example using the same device or instrument) as the one to be used in the field.

In one embodiment, a non-controlled illumination source may be used, provided that its spectral characteristics can be determined, through a spectral measurement and a subsequent correction may be made prior to extracting the measured spectral information from object 10 or mark 11 to be authenticated.

Figure 38:
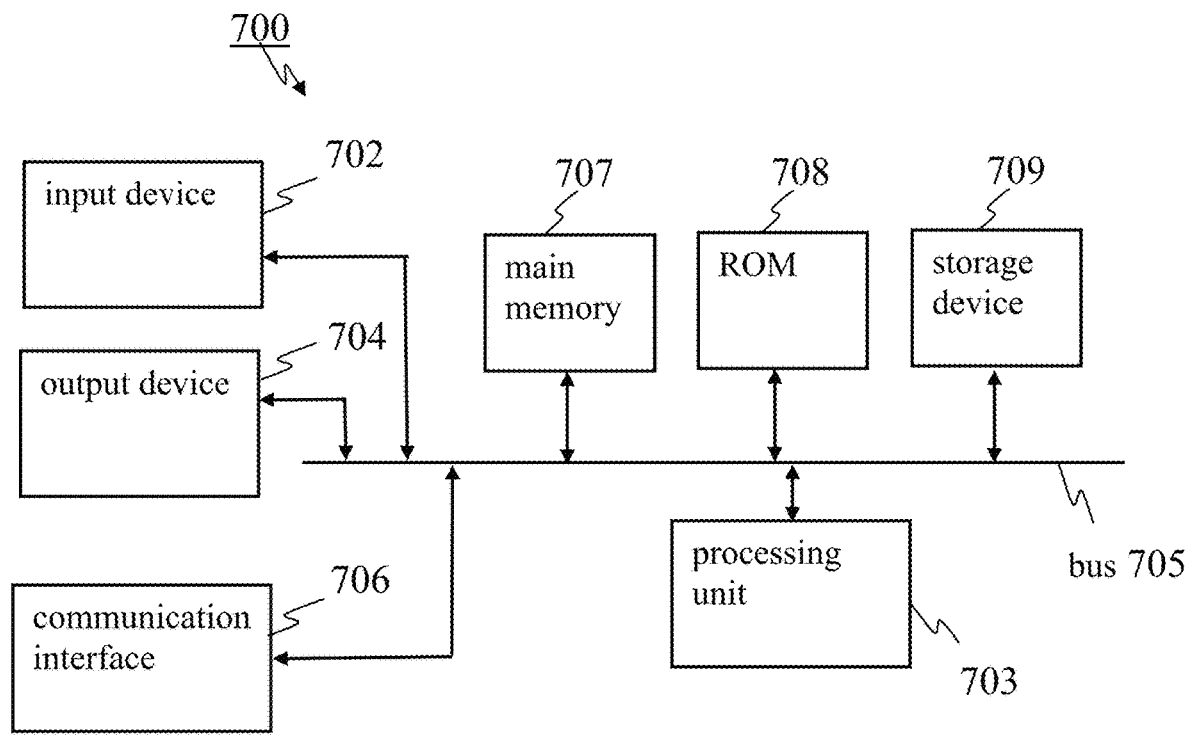
FIG. 38 is a schematic diagram of an exemplary implementation of a computing unit according to one embodiment of the invention.

FIG. 38 is a schematic diagram of an exemplary implementation of a computing unit 700 that may be used in embodiments of the invention, such as, but not only, for generating the above-discussed measure of authenticity.

As illustrated by FIG. 38, a computing unit 700 may include a bus 705, a processing unit 703, a main memory 707, a ROM 708, a storage device 709, an input device 702, an output device 704, and a communication interface 706.

Bus 705 may include a path that permits communication among the components of computing unit 700.

Processing unit 703 may include a processor, a microprocessor, or processing logic that may interpret and execute instructions. Main memory 707 may include a RAM or another type of dynamic storage device that may store information and instructions for execution by processing unit 703. ROM 708 may include a ROM device or another type of static storage device that may store static information and instructions for use by processing unit 703. Storage device 709 may include a magnetic and/or optical recording medium and its corresponding drive.

Input device 702 may include a mechanism that permits an operator to input information to processing unit 703, such as a keypad, a keyboard, a mouse, a pen, voice recognition and/or biometric mechanisms, etc. Output device 704 may include a mechanism that outputs information to the operator, including a display, a printer, a speaker, etc. Communication interface 706 may include any transceiver-like mechanism that enables computing unit 700 to communicate with other devices and/or systems (such as with a base station, a WLAN access point, etc.). For example, communication interface 706 may include mechanisms for communicating with another device or system via a network.

Computing unit 700 may perform certain operations or processes described herein. These operations may be performed in response to processing unit 703 executing software instructions contained in a computer-readable medium, such as main memory 707, ROM 708, and/or storage device 709. A computer-readable medium may be defined as a physical or a logical memory device. For example, a logical memory device may include memory space within a single physical memory device or distributed across multiple physical memory devices. Each of main memory 707, ROM 708 and storage device 709 may include computer-readable media. The magnetic and/or optical recording media (e.g., readable CDs or DVDs) of storage device 709 may also include computer-readable media. The software instructions may be read into main memory 707 from another computer-readable medium, such as storage device 709, or from another device via communication interface 706.

The software instructions contained in main memory 709 may cause processing unit 703 to perform operations or processes described herein, such as for example generating the measure of authenticity. Alternatively, hardwired circuitry may be used in place of or in combination with software instructions to implement processes and/or operations described herein. Thus, implementations described herein are not limited to any specific combination of hardware and software.

FIG. 39 schematically illustrates an example of imaging period and illumination period, in one embodiment of the invention. This drawing has been already referred to and elaborated upon throughout the above description.

In one embodiment, imaging system 200 comprises, on the one hand, an imaging device comprising image sensor arrangement 60 and, on the other hand, a piece of equipment, hereinafter referred to as "imaging accessory", comprising dispersive imaging arrangement 30.

In this embodiment, the imaging device has a built-in camera (including associated lenses) and may be a handheld device, such as for example at least one of: a mobile phone, a smartphone, a feature phone, a tablet computer, a phablet, a portable media player, a netbook, a gaming device, a personal digital assistant, and a portable computer device. The imaging device's built-in camera image sensors act as image sensor arrangement 60 in system 200.

As mentioned above, the imaging accessory comprises dispersive imaging arrangement 30, such as for example a transmission diffraction grating, or any other dispersive element as already discussed above with reference to FIG. 1.

The imaging accessory is attachable, directly or indirectly (for example via a connecting piece of equipment), to the imaging device so that the imaging accessory's dispersive imaging arrangement 30 is positioned relative to the imaging device's image sensor arrangement 60 in such a manner that the imaging device and the imaging accessory form an imaging system 200 as described above, operable for imaging an object and generating a measure of authenticity of the object. In other words, the imaging accessory may be used for example to transform a smartphone into a portable imaging and authentication system as described above. The imaging accessory may for example be fixedly positionable over the smartphone rear camera. The processing and communications capabilities of the smartphone may then be used for implementing a processing unit 70 of imaging system 200.

Furthermore, if the imaging device has a light source (such as for example flash LEDs used in a smartphone), said light source may operate as illumination arrangement 210 to illuminate the object 10 to be imaged and authenticated. A smartphone's light source is typically well adapted for reflectivity measurements. Alternatively, illumination arrangement 210 may be provided as part of the imaging accessory.

This embodiment is advantageous in that the imaging accessory may be a passive accessory, requiring no additional power, and thus providing an affordable authentication solution.

Figure 40:
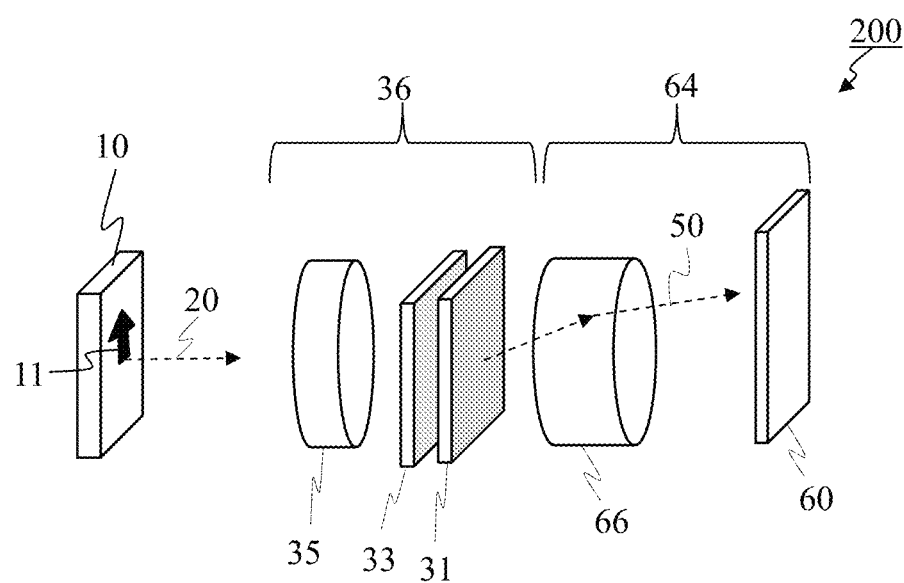
FIG. 40 schematically illustrates an imaging system comprising, on the one hand, an imaging device comprising an image sensor arrangement, wherein the imaging device is a mobile phone having a camera, and, on the other hand, an imaging accessory comprising a dispersive imaging arrangement.

FIG. 40 schematically illustrates an imaging system 200 in accordance with the above-described embodiment comprising, on the one hand, an imaging device comprising image sensor arrangement 60, wherein the imaging device is a mobile phone having a camera, and, on the other hand, an imaging accessory 36 comprising dispersive imaging arrangement 30. In this exemplary optical setup, imaging accessory 36 comprises a diffraction grating 31 and long pass filter 33 arranged in front of the mobile phone camera 64. The mobile phone camera 64 comprises an image sensor 60 and a built-in lens 66. Optionally, an additional collimating lens 35 may be positioned in front of imaging accessory 36.

The invention further relates to the following embodiments:

Embodiment (X2). Imaging system (200) of claim 1, wherein the imaging system (200) is an imaging device.

Embodiment (X3). Imaging system (200) of claim 1, comprising an imaging device (100) comprising the image sensor arrangement (60) and the dispersive imaging arrangement (30), wherein the imaging device (100) is not configured to generate the measure of authenticity.

Embodiment (X4). Imaging system (200) of embodiment (X2) or (X3), wherein the imaging device is a hand-held device.

Embodiment (X7). Imaging system (200) according to any one of claims 1 to 3 and embodiments (X2) to (X4), wherein
the imaging system (200) is configured for generating the measure of authenticity after the image sensor arrangement (60) has, in a plurality of illumination periods ($t_1$, $t_2$, ..., $t_n$), imaged the dispersed electromagnetic radiation (50); and
generating the measure of authenticity comprises:
generating, for each illumination period ($t_i$), an intermediate measure of authenticity ($k_i$) depending at least on a relation between the dispersed electromagnetic radiation (50) imaged at the illumination period ($t_i$) and a part of the reference spectral information, said part of the reference spectral information being associated with how the object (10) has been illuminated during the illumination period ($t_i$); and
generating the measure of authenticity (m) based on the plurality of generated intermediate measures of authenticity ($k_1$, $k_2$, ..., $k_n$).

Embodiment (X8). Imaging system (200) of embodiment (X7), wherein generating, for each illumination period ($t_i$), the intermediate measure of authenticity ($k_i$) comprises:
deconvolving the dispersed electromagnetic radiation (50) imaged at the illumination period ($t_i$) by said part of the reference spectral information associated with how the object (10) has been illuminated during the illumination period ($t_i$).

Embodiment (X9). Imaging system (200) according to any one of claims 1 to 3 and embodiments (X2) to (X4), wherein
the imaging system (200) is configured for generating the measure of authenticity after the image sensor arrangement (60) has, in a plurality of illumination periods ($t_1$, $t_2$, ..., $t_n$), imaged the dispersed electromagnetic radiation (50), and
generating the measure of authenticity comprises:
processing the imaged dispersed electromagnetic radiation based at least on the dispersed electromagnetic radiation imaged at a first illumination period ($t_1$) among the plurality of illumination periods ($t_1$, $t_2$, ..., $t_n$) and the dispersed electromagnetic radiation imaged at a second illumination period ($t_2$) among the plurality of illumination periods ($t_1$, $t_2$, $t_n$), wherein the illumination conditions during the first illumination period ($t_1$) at least partially differ from the illumination conditions during the second illumination period ($t_2$); and
generating the measure of authenticity (m) depending at least on a relation between the processed imaged dispersed electromagnetic radiation ($A_x$), and the reference spectral information.

Embodiment (X10). Imaging system (200) of embodiment (X9), wherein generating the measure of authenticity (m) comprises:
deconvolving the processed imaged dispersed electromagnetic radiation ($A_x$) by the reference spectral information.

Embodiment (X15). Imaging system (200) of claim 6, wherein the at least one machine readable code comprises at least one of a linear barcode and a matrix barcode.

Embodiment (X16). Imaging system (200) according to any one of claims 5 and 6 and embodiment (X15), wherein the marking (11) comprises single spectral characteristics at least over one region of the marking (11).

Embodiment (X17). Imaging system (200) of embodiment (X16), wherein the marking (11) comprises single spectral characteristics over the whole marking (11).

Embodiment (X18). Imaging system (200) according to any one of claims 5 and 6 and embodiments (X15) to (X17), wherein the marking (11) comprises at least one of: optical agents producing specific reflective properties upon controlled illumination, and optical agents producing luminescence upon controlled illumination.

Embodiment (X19). System (220) comprising an imaging system (200) according to any one of claims 1 to 6, and embodiments (X2) to (X4), (X7) to (X10), and (X15) to (X18), and an illumination arrangement (210) for controlled illumination of the object (10).

Embodiment (X21). Imaging method of claim 7, wherein the imaging method is carried out by an imaging device.

Embodiment (X22). Imaging method of claim 7, wherein the imaging method is carried out by an imaging system (200) comprising
an imaging device (100) comprising the image sensor arrangement (60) and the dispersive imaging arrangement (30), wherein the imaging device (100) does not generate (s400) the measure of authenticity.

Embodiment (X23). Imaging method of embodiment (X21) or (X22), wherein the imaging device is a hand-held device.

Embodiment (X30). Imaging method according to any one of claims 7 to 13 and embodiments (X21) to (X23), wherein the dispersive imaging arrangement (30) comprises at least one of:
a diffractive element,
a transmission diffraction grating,
a blazed transmission diffraction grating,
a volume holographic grating,
a grism;
a reflective diffraction grating, and
a dispersive prism.

Embodiment (X31). Imaging method according to any one of claims 7 to 13 and embodiments (X21) to (X23) and (X30), wherein a slit is not used between the dispersive imaging arrangement (30) and the object (10) to be imaged.

Embodiment (X33). Imaging method of claim 14, wherein the marking (11) comprises at least one machine readable code.

Embodiment (X34). Imaging method of embodiment (X33), wherein the at least one machine readable code comprises at least one of a linear barcode and a matrix barcode.

Embodiment (X35). Imaging method according to any one of claim 14 and embodiments (X33) and (X34), wherein the marking (11) comprises single spectral characteristics at least over one region of the marking (11).

Embodiment (X36). Imaging method of embodiment (X35), wherein the marking (11) comprises single spectral characteristics over the whole marking (11).

Embodiment (X37). Imaging method according to any one of claim 14 and embodiments (X33) to (X36), wherein the marking (11) comprises at least one of: optical agents producing specific reflective properties upon controlled illumination, and optical agents producing luminescence upon controlled illumination.

Embodiment (X39). Computer program or set of computer programs comprising computer-executable instructions configured, when executed a computer or set of computers, to carry out an imaging method according to any one of claims 7 to 15, and embodiments (X21) to (X23) and (X30) to (X37).

Embodiment (X40). Computer program product or set of computer program products comprising a computer program or set of computer programs according to embodiment (X39).

Embodiment (X41). Storage medium storing a computer program or set of computer programs according to embodiment (X39).

Where the terms "processing unit", "storage unit", etc. are used herewith, no restriction is made regarding how distributed these elements may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units, such as for example processing unit 70, or devices, such as for example imaging device 110, may be implemented in hardware, software, field-programmable gate array (FPGA), application-specific integrated circuit (ASICs), firmware or the like.

In further embodiments of the invention, any one of the above-mentioned processing unit, storage unit, etc. is replaced by processing means, storage means, etc. or processing module, storage module, etc. respectively, for performing the functions of the processing unit, storage unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

Abbreviations

ASICs application-specific integrated circuit
a.u. arbitrary units
CASSI coded aperture snapshot spectral imager
CCD charge-coupled device
CMOS complementary metal-oxide-semiconductor
CTIS computed tomography imaging spectrometer
DIBS differential illumination background subtraction
FOV field of view
FPGA field-programmable gate array
l/mm lines per mm
LED light-emitting diode
LTI linear translation-invariant
MAFC multi-aperture filtered camera
MIFTS multiple-image Fourier transform spectrometer
NIR near-infrared
RAM random-access memory
RMS root mean square
ROM read-only memory
SHIFT snapshot hyperspectral imaging Fourier transform spectrometer
SWIR short-wavelength infrared
UV ultraviolet
WLAN wireless local area network

The invention claimed is:

1. An imaging system for generating a measure of authenticity of an object, the imaging system comprising: an image sensor arrangement having one or more image sensors; and a dispersive imaging arrangement having one or more optical elements, wherein the dispersive imaging arrangement is so that, when electromagnetic radiation from the object illuminates the dispersive imaging arrangement, at least part of the electromagnetic radiation is dispersed; and positioned relative to the image sensor arrangement in such a manner as to allow the image sensor arrangement to image said dispersed electromagnetic radiation so as to obtain a dispersed image; the imaging system being configured for, after the image sensor arrangement has, in at least one imaging period, imaged the dispersed electromagnetic radiation, generating a measure of authenticity of the object, wherein a synthetic non-dispersed image computed using the imaged dispersed electromagnetic radiation and a reference spectral information is used in the generating of the measure of authenticity of the object.

2. The imaging system of claim 1, wherein generating the measure of authenticity comprises:
   deconvolving the imaged dispersed electromagnetic radiation by the reference spectral information.

3. The imaging system of claim 2, wherein generating the measure of authenticity further comprises determining at least one of:
   a measure of decodability of an imaged machine-readable code in the result of the deconvolution;
   a measure of sharpness of the result of the deconvolution;
   a measure of blurriness of the result of the deconvolution;
   a measure of the dimension of the result of the deconvolution;
   a measure of the area of the result of the deconvolution;
   a measure of the full width at half maximum of a cross-section of the result of the deconvolution; and
   a measure of the similarity of the result of the deconvolution to a reference pattern.

4. The imaging system according to claim 1, wherein the dispersive imaging arrangement comprises at least one of:
   a diffractive element,
   a transmission diffraction grating,
   a blazed transmission diffraction grating,
   a volume holographic grating,
   a grism;
   a reflective diffraction grating, and
   a dispersive prism.

5. The imaging system according to claim 1, for imaging an object bearing a marking.

6. The imaging system of claim 5, wherein the marking comprises at least one machine readable code.

7. An imaging method for generating a measure of authenticity of an object, the imaging method making use of: an image sensor arrangement having one or more image sensors; and a dispersive imaging arrangement having one or more optical elements, wherein the dispersive imaging arrangement is so that, when electromagnetic radiation from the object illuminates the dispersive imaging arrangement, at least part of the electromagnetic radiation is dispersed; and positioned relative to the image sensor arrangement in such a manner as to allow the image sensor arrangement to image said dispersed electromagnetic radiation so as to obtain a dispersed image; and the imaging method comprising: imaging, by the image sensor arrangement, in at least one imaging period, the dispersed electromagnetic radiation, and generating a measure of authenticity of the object depending at least on a relation between the imaged dispersed electromagnetic radiation and reference spectral information, wherein a synthetic non-dispersed image computed using the imaged dispersed electromagnetic radiation and a reference spectral information is used in the generating of the measure of authenticity of the object.

8. The imaging method of claim 7, wherein generating the measure of authenticity comprises deconvolving the imaged dispersed electromagnetic radiation by the reference spectral information.

9. The imaging method of claim 8, wherein generating the measure of authenticity further comprises determining at least one of:
   a measure of decodability of an imaged machine-readable code in the result of the deconvolution;
   a measure of sharpness of the result of the deconvolution;
   a measure of blurriness of the result of the deconvolution;
   a measure of the dimension of the result of the deconvolution;
   a measure of the area of the result of the deconvolution;
   a measure of the full width at half maximum of a cross-section of the result of the deconvolution; and
   a measure of the similarity of the result of the deconvolution to a reference pattern.

10. The imaging method according to claim 7, comprising imaging, by the image sensor arrangement, in a plurality of illumination periods, the dispersed electromagnetic radiation,
    wherein generating the measure of authenticity comprises:
       generating, for each illumination period, an intermediate measure of authenticity depending at least on a relation between the dispersed electromagnetic radiation imaged at the illumination period and a part of the reference spectral information, said part of the reference spectral information being associated with how the object has been illuminated during the illumination period; and
       generating the measure of authenticity based on the plurality of generated intermediate measures of authenticity.

11. The imaging method of claim 10, wherein generating, for each illumination period, the intermediate measure of authenticity comprises:
    deconvolving the dispersed electromagnetic radiation imaged at the illumination period by said part of the reference spectral information associated with how the object has been illuminated during the illumination period.

12. The imaging method according to claim 7, comprising imaging, by the image sensor arrangement, in a plurality of illumination periods, the dispersed electromagnetic radiation,
    wherein generating the measure of authenticity comprises:
       processing the imaged dispersed electromagnetic radiation based at least on the dispersed electromagnetic radiation imaged at a first illumination period among the plurality of illumination periods and the dispersed electromagnetic radiation imaged at a second illumination period among the plurality of illumination periods, wherein the illumination conditions during the first illumination period at least partially differ from the illumination conditions during the second illumination period; and
       generating the measure of authenticity depending at least on a relation between the processed imaged dispersed electromagnetic radiation, and the reference spectral information.

13. The imaging method of claim 12, wherein generating the measure of authenticity comprises:
    deconvolving the processed imaged dispersed electromagnetic radiation by the reference spectral information.

14. The imaging method according to claim 7, for imaging an object bearing a marking.

15. The imaging method according to claim 7, further comprising a step of controlled illumination of the object.

* * * * *